United States Patent
Xia et al.

(10) Patent No.: US 10,420,076 B2
(45) Date of Patent: Sep. 17, 2019

(54) RESOURCE ALLOCATION METHOD AND DEVICE AND INFORMATION FEEDBACK METHOD AND DEVICE

(71) Applicant: ZTE CORPORATION, Shenzhen, Guangdong Province (CN)

(72) Inventors: Shuqiang Xia, Shenzhen (CN); Wen Zhang, Shenzhen (CN); Bo Dai, Shenzhen (CN); Jing Shi, Shenzhen (CN); Huiying Fang, Shenzhen (CN); Xianming Chen, Shenzhen (CN); Kun Liu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/546,008

(22) PCT Filed: Feb. 1, 2016

(86) PCT No.: PCT/CN2016/073106
§ 371 (c)(1),
(2) Date: Jul. 25, 2017

(87) PCT Pub. No.: WO2016/119760
PCT Pub. Date: Aug. 4, 2016

(65) Prior Publication Data
US 2018/0027525 A1   Jan. 25, 2018

(30) Foreign Application Priority Data
Jan. 30, 2015   (CN) .......................... 2015 1 0052281

(51) Int. Cl.
H04W 72/04  (2009.01)
H04W 28/06  (2009.01)
(Continued)

(52) U.S. Cl.
CPC .......... *H04W 72/04* (2013.01); *H04L 1/1812* (2013.01); *H04W 28/06* (2013.01); *H04W 4/70* (2018.02)

(58) Field of Classification Search
CPC ..... H04W 72/04; H04W 4/005; H04W 28/06; H04W 4/70; H04L 1/1812
(Continued)

(56) References Cited

U.S. PATENT DOCUMENTS

2011/0206024 A1 *  8/2011  Lee ................. H04B 7/0619
                                                    370/338
2013/0242816 A1 *  9/2013  He .................. H04W 72/0413
                                                    370/280
(Continued)

FOREIGN PATENT DOCUMENTS

CN    101527961 A    9/2009
CN    102970708 A    3/2013
(Continued)

OTHER PUBLICATIONS

R1-081586; 3GPP TSG-RAN WG1 Meeting #52bis, Shenzhen, China, Mar. 31-Apr. 4, 2008; 36.213 PUCCH timing and other formatting and typo corrections, Motorola, R1, LTE-Phys, F, Apr. 8, 2008, Rel-8. XP50596728A.
(Continued)

*Primary Examiner* — Faisal Choudhury
(74) *Attorney, Agent, or Firm* — McDonald Hopkins LLC

(57) ABSTRACT

Provided are a resource allocation method and device and an information feedback method and device. The resource allocation method includes: a resource allocation sending end sends information about resources allocated to a resource allocation receiving end to the resource allocation receiving end through a first portion and a second portion of total indication amount Q bits, the first portion contains first
(Continued)

100

A resource allocation sending end sends information about resources allocated to a resource allocation receiving end to the resource allocation receiving end through a first portion and a second portion of total indication amount Q bits.

indication amount $Q_1$ bits, and the second portion contains second indication amount $Q_2$ bits, the number of resources allocated to the resource allocation receiving end is K, resource indexes corresponding to the K resources are $S_i$, $i \in [0, 1, 2 \ldots K-1]$, $S_i < S_i + 1$, $1 \leq K \leq M$, and M is the number of virtual continuous resources allowed to be allocated by the resource allocation receiving end.

18 Claims, 3 Drawing Sheets

(51) Int. Cl.
*H04L 1/18* (2006.01)
*H04W 4/70* (2018.01)

(58) Field of Classification Search
USPC .................................................. 370/329
See application file for complete search history.

(56) References Cited

U.S. PATENT DOCUMENTS

| 2013/0265944 A1* | 10/2013 | Frenne | H04L 1/0031 |
| | | | 370/329 |
| 2014/0057637 A1* | 2/2014 | Hoang | H04W 56/0045 |
| | | | 455/445 |

FOREIGN PATENT DOCUMENTS

| CN | 102970709 A | 3/2013 |
| CN | 102970753 A | 3/2013 |
| EP | 2560451 A2 | 2/2013 |
| WO | WO2011159132 A2 | 12/2011 |

OTHER PUBLICATIONS

R1-130001; 3GPP TSG RAN WG1 Meeting #72, Saint Julian's, MALTA, Jan. 28-Feb. 1, 2013; Final Report of 3GPP TSG RAN WG1 #71 v1.0.0 (New Orleans, USA, Nov. 12-16, 2012), MCC Support, XP50696655A.

* cited by examiner

100

A resource allocation sending end sends information about
resources allocated to a resource allocation receiving end
to the resource allocation receiving end through a first portion
and a second portion of total indication amount Q bits.

An HARQ information sending end sends Hybrid Automatic
Repeat Request (HARQ) information through a first portion
and a second portion of total feedback indication amount Q bits.

A resource allocation receiving end receives information about resources
allocated to the resource allocation receiving end itself sent through a f
irst portion and a second portion of total indication amount Q bits.

301

The resources allocated to the resource allocation receiving end itself are
determined according to values of first indication amount Q1 bits of
the first portion and values of second indication amount Q2 bits of
the second portion.

FIG. 3

RESOURCE ALLOCATION METHOD AND DEVICE AND INFORMATION FEEDBACK METHOD AND DEVICE

TECHNICAL FIELD

This document relates to but not limited to the field of communication, in particular to a resource allocation method and device and an information feedback method and device.

BACKGROUND

Machine Type Communication (MTC) User Equipment (UE) is also called as Machine to Machine (M2M) user equipment and is a main application form of Internet of Things at present.

Low cost is an important guarantee for large-scale application of M2M user equipment. M2M user equipment deployed in the market at present is mainly based on a Global System of Mobile communication (GSM) system. With the development of a Long Term Evolution (LTE) system with high spectrum efficiency, as more and more mobile operators have already determined LTE as an evolution direction of future broadband wireless communication systems, various data services of LTE-based M2M user equipment will become more attractive.

In order to reduce the cost of M2M user equipment, decreasing UE uplink and/or downlink transmission bandwidth (including baseband and radio-frequency bandwidth) is a very effective means to reduce the cost of M2M user equipment. For example, when uplink transmission bandwidth and/or downlink transmission bandwidth of all M2M user equipment are/is set to not exceed 1.4 MHz, it means that, no matter how large system bandwidth is, e.g., if a base station has 100 resource blocks which can be set for allocation when the system bandwidth is 20 MHz, the base station at most can only allocate 6 resource blocks to M2M user equipment.

In existing resource allocation methods, most methods are based on available resources within entire bandwidth. For M2M user equipment, the existing resource allocation methods have various defects such as large overhead and allocation inflexibility.

SUMMARY

The following is a summary of the subject described in detail in this text. This summary is not used for limiting the protection scope of the claims.

The embodiments of the present disclosure provide a resource allocation method and device and an information feedback method and device, which can reduce overhead during resource allocation and realize flexible resource allocation indication.

Herein, the embodiment of the present disclosure provides a resource allocation method, including:

a resource allocation sending end sending information about resources allocated to a resource allocation receiving end to the resource allocation receiving end through a first portion and a second portion of total indication amount Q bits, herein the first portion contains first indication amount of $Q_1$ bits and the second portion contains second indication amount $Q_2$ bits, a number of resources allocated to the resource allocation receiving end is K, resource indexes corresponding to the K resources are $S_i$, $i \in [0, 1, 2 \ldots K-1]$, $S_i < S_{i+1}$, $1 \leq K \leq M$, and M is a number of virtual continuous resources allowed to be allocated by the resource allocation receiving end.

In an exemplary embodiment, the M virtual continuous resources are any virtual continuous resources in resources with a total number of N, herein resource indexes of the resources with the total number of N are sequentially 0, 1 ... N-1, and M is a positive integer greater than or equal to 2.

In an exemplary embodiment, the step of sending information about resources allocated to a resource allocation receiving end to the resource allocation receiving end through a first portion and a second portion of total indication amount Q bits includes:

determining values of the first indication amount $Q_1$ bits of the first portion and values of the second indication amount $Q_2$ bits of the second portion according to a smallest resource index $S_0$ or a largest resource index $S_{K-1}$; and sending information about resources allocated to the resource allocation receiving end to the resource allocation receiving end through the values of the first indication amount $Q_1$ bits of the first portion and the values of the second indication amount $Q_2$ bits of the second portion.

In an exemplary embodiment, the step of determining values of the first indication amount $Q_1$ bits of the first portion and values of the second indication amount $Q_2$ bits of the second portion includes:

predetermining the values of the first indication amount $Q_1$ bits of the first portion and the values of the second indication amount $Q_2$ bits of the second portion according to the smallest resource index $S_0$; or predetermining the values of the first indication amount $Q_1$ bits of the first portion and the values of the second indication amount $Q_2$ bits of the second portion according to the largest resource index $S_{K-1}$.

In an exemplary embodiment, when $S_0 \leq N-M$, the first portion is a first preset binary number corresponding to the resource index $S_0$ and expressed by the first indication amount $Q_1$ bits;

when $S_0 \leq N-M$ and K=1, the values of the second indication amount $Q_2$ bits of the second portion are all 0;

when $S_0 \leq N-M$ and K>1, the second indication amount $Q_2$ bits of the second portion correspond to resources with resource indexes being $S_0+1$, $S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0; and when $S_0 > N-M$, the first portion is a second preset binary number expressed by the first indication amount $Q_1$ bits; and the second indication amount $Q_2$ bits of the second portion correspond to resources with resource indexes being N-M+1, N-M+2 ... N-1 one to one, and when $S_i \in \{N-M+1, N-M+2 \ldots N-1\}$, $i=0, 1, 2 \ldots K-1$, a value of a bit corresponding to the resource index $S_i$ is 1 and values of other bits are 0, herein the first preset binary number is different from the second preset binary number.

In an exemplary embodiment, the first preset binary number expressed by the first indication amount $Q_1$ bits is $((S_0+C)\%(2^{Q_1}-1))_{binary}$ or $(S_0)_{binary}$, where C is any integral constant.

In an exemplary embodiment, when $S_{K-1} \geq M-1$, a value of the first portion is a third preset binary number corresponding to the resource index $S_{K-1}$ and expressed by the first indication amount $Q_1$ bits;

when $S_{K-1} \geq M-1$ and K=1, the values of the second indication amount $Q_2$ bits of the second portion are all 0;

when $S_{K-1} \geq M-1$ and $K \geq 1$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1, \ldots K-2$, a value of the second portion corresponding to the resource index $S_i$ is 1 and values of other bits are 0; and when $S_{K-1} < M-1$, the first portion is a fourth preset binary number expressed by the first indication amount $Q_1$ bits; and the second indication amount $Q_2$ bits of the second portion correspond to resources with resource indexes being $0, 1 \ldots M-2$ one to one, and when $S_i \in \{0, 1 \ldots M-2\}$, $i=0, 1 \ldots K-1$, a value of a bit corresponding to the resource index $S_i$ is 1 and values of other bits are 0, herein the third preset binary number is different from the fourth preset binary number.

In an exemplary embodiment, the third preset binary number expressed by the first indication amount $Q_1$ bits is $((S_{K-1}+C)\%(2^{Q_1}-1))_{binary}$ or $(S_{K-1})_{binary}$, where C is any integral constant.

In an exemplary embodiment, a bit value of the first portion is a first preset binary number corresponding to the resource index $S_0$ and expressed by the first indication amount $Q_1$ bits; or a second preset binary number corresponding to the resource index $S_{K-1}$ and expressed by the first indication amount $Q_1$ bits.

In an exemplary embodiment, the first preset binary number is $((S_0+C)\%(2^{Q_1}-1))_{binary}$ or $(S_0)_{binary}$;

the second preset binary number is $((S_{K-1}+C)\%(2^{Q_1}-1))_{binary}$ or $(S_{K-1})_{binary}$, where C is any integral constant, when the first preset binary number is $((S_0+C)\%(2^{Q_1}-1))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0; and when the second preset binary number is $((S_{K-1}+C)\%(2^{Q_1}-1))_{binary}$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1 \ldots K-2$, a value of the second portion corresponding to the resource index $S_i$ is 1 and values of other bits are 0.

In an exemplary embodiment, when the first preset binary number is $((S_0+C)\%(2^{Q_1}-1))_{binary}$, for the other bits with values which are not 1 in the second indication amount $Q_2$ bits of the second portion, when $S_0+i > N-1$, $i=1, 2 \ldots M-1$, a value of a bit corresponding to $S_0+i$ is the first preset binary number; and when the second preset binary number is $((S_{K-1}+C)\%(2^{Q_1}-1))_{binary}$, for the other bits with values which are not 1 in the second indication amount $Q_2$ bits of the second portion, when $S_{K-1}-1 < 0$, $i=1, 2 \ldots M-1$, a value of a bit corresponding to $S_{K-1}-1$ is the second preset binary number.

In an exemplary embodiment, the step of sending information about resources allocated to a receiving end to the receiving end includes:

indicating that resources corresponding to bits with values which are 1 are the resources allocated to the resource allocation receiving end through the bits with values which are 1 in the second indication amount $Q_2$ bits of the second portion.

In an exemplary embodiment, the total indication amount Q is greater than or equal to $\lceil \log_2(N-M+2) \rceil + M-1$; the first indication amount $Q_1$ is greater than or equal to $\lceil \log_2(N-M+2) \rceil$; and the second indication amount $Q_2$ is greater than or equal to $M-1$; or the total indication amount Q is greater than or equal to $\lceil \log_2(N) \rceil + M-1$; the first indication amount $Q_1$ is greater than or equal to $\lceil \log_2(N) \rceil$; and the second indication amount $Q_2$ is greater than or equal to $M-1$.

In an exemplary embodiment, the method further includes:

when two groups or more than two groups with each group having M virtual continuous resources need to be allocated, adding a preset number of bits to indicate resource group indexes of allocated resource groups according to a number of groups of resources which need to be allocated.

In another aspect, the embodiment of the present disclosure further provides an information feedback method, including:

a Hybrid Automatic Repeat Request (HARQ) information sending end sending HARQ information through a first portion and a second portion of total feedback indication amount Q bits, herein the first portion contains a first indication amount $Q_1$ bits and the second portion contains a second indication amount $Q_2$ bits, a number of detection results which are ACK in the HARQ information is K, $0 \leq K \leq M$, a resource index corresponding to an ith ACK is allocated to be $S_i$, wherein $i \in [0, 1, 2 \ldots K-1]$, $S_i < S_i+1$ and M is a maximum number of virtual continuous resources about which HARQ information is allowed to be fed back by an HARQ information receiving end.

In an exemplary embodiment, the M virtual continuous resources are any virtual continuous resources in resources with a total number of N, herein resource indexes of the resources with the total number of N are sequentially $0, 1 \ldots N-1$, and M is a positive integer greater than or equal to 2.

In an exemplary embodiment, the step of sending HARQ information through a first portion and a second portion of total indication amount Q bits includes:

according to a resource index $S_0$ corresponding to a 0th ACK or a resource index $S_{K-1}$ corresponding to a (K-1)th ACK, determining values of the first indication amount $Q_1$ bits of the first portion and values of the second indication amount $Q_2$ bits of the second portion of the total feedback indication amount Q bits; and sending HARQ information through the values of the first indication amount $Q_1$ bits of the first portion and the values of the second indication amount $Q_2$ bits of the second portion.

In an exemplary embodiment, the step of determining values of the first indication amount $Q_1$ bits of the first portion and values of the second indication amount $Q_2$ bits of the second portion includes:

predetermining the values of the first indication amount $Q_1$ bits of the first portion and the values of the second indication amount $Q_2$ bits of the second portion according to the resource index $S_0$; or predetermining the values of the first indication amount $Q_1$ bits of the first portion and the values of the second indication amount $Q_2$ bits of the second portion according to the resource index $S_{K-1}$.

In an exemplary embodiment, when $K \neq 0$ and $S_0 \leq N-M$, the first portion is a fifth preset binary number corresponding to the resource index $S_0$ and expressed by the first indication amount $Q_1$ bits;

when $K=1$ and $S_0 \leq N-M$, the values of the second indication amount $Q_2$ bits of the second portion are all 0;

when $K>1$ and $S_0<N-M$, the values of the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0;

when $K \neq 0$ and $S_0 > N-M$, the first portion is a sixth preset binary number expressed by the first indication amount $Q_1$ bits;

when $S_0 > N-M$, the second indication amount $Q_2$ bits of the second portion correspond to resources with resource indexes being $N-M+1, N-M+2 \ldots N-1$ one to one, and when $S_i \in \{N-M+1, N-M+2 \ldots N-1\}$, $i=1, 2 \ldots K-1$, a value of a bit corresponding to the resource index $S_i$ is 1 and values of other bits are 0; and when $K=0$, the first portion is a seventh preset binary number expressed by the first indication amount $Q_1$ bits, herein every two of the fifth preset binary number, the sixth preset binary number and the seventh preset binary number are different.

In an exemplary embodiment, the fifth preset binary number expressed by the first indication amount $Q_1$ bits is $((S_0+C)\%(2^{Q_1}-1))_{binary}$ or $(S_0)_{binary}$, where C is any integral constant.

In an exemplary embodiment, when $K \neq 0$ and $S_{K-1} > M-1$, the first portion is an eighth preset binary number corresponding to the resource index $S_{K-1}$ and expressed by the first indication amount $Q_1$ bits;

when $S_{K-1} \geq M-1$ and $K=1$, the values of the second indication amount $Q_2$ bits of the second portion are all 0;

when $S_{K-1} \geq M-1$ and $K>1$, the values of the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1, \ldots K-2$, a value of a bit corresponding to the resource index $S_i$ is 1 and values of other bits are 0;

when $K \neq 0$ and $S_{K-1} < M-1$, the value of the first portion is a ninth preset binary number expressed by the first indication amount $Q_1$ bits;

when $K=0$, the first portion is a tenth preset binary number expressed by the first indication amount $Q_1$ bits; and when $S_{K-1} < M-1$, the values of the second indication amount $Q_2$ bits of the second portion correspond to resources with resource indexes being $0, 1 \ldots M-2$ one to one, and when $S_i \in \{0, 1 \ldots M-2\}$, $i=0, 1 \ldots K-1$, a value of a bit corresponding to the resource index $S_i$ is 1 and values of other bits are 0, herein every two of the eighth preset binary number, the ninth preset binary number and the tenth preset binary number are different.

In an exemplary embodiment, the eighth preset binary number expressed by the first indication amount $Q_1$ bits is $((S_{K-1}+C)\%(2^{Q_1}-1))_{binary}$ or $(S_{K-1})_{binary}$, where C is any integral constant.

In an exemplary embodiment, a bit value of the first portion is a third preset binary number corresponding to the resource index $S_0$ and expressed by the first indication amount $Q_1$ bits; or a fourth preset binary number corresponding to the resource index $S_{K-1}$ and expressed by the first indication amount $Q_1$ bits.

In an exemplary embodiment, the third preset binary number is $((S_0+C)\%(2^{Q_1}-1))_{binary}$ or $(S_0)_{binary}$;

the fourth preset binary number is $((S_{K-1}+C)\%(2^{Q_1}-1))_{binary}$ or $(S_{K-1})_{binary}$, where C is any integral constant, when $K \neq 0$ and the first preset binary number is $((S_0+C)\%(2^{Q_1}-1))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0;

when the second preset binary number is $((S_{K-1}+C)\%(2^{Q_1}-1))_{binary}$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1 \ldots K-2$, a value of the second portion corresponding to the resource index $S_i$ is 1 and values of other bits are 0;

when $K=0$ and the first preset binary number is $((S_0+C)\%(2^{Q_1}-1))_{binary}$, a bit value of the first portion is $((u+C)\%(2^{Q_1}-1))_{binary}$, wherein $N-M \leq u < N$ and u is a positive integer; and the second indication amount $Q_2$ bits of the second portion are a fifth preset binary number; the fifth preset binary number is different from a value of $((u+C)\%(2^{Q_1}-1))_{binary}$ when $K=0$;

when $K \neq 0$ and the first preset binary number is $((S_{K-1}+C)\%(2^{Q_1}-1))_{binary}$, a bit value of the first portion is $((u+C)\%(2^{Q_1}-1))_{binary}$, wherein u is an integer and $0 \leq u < M-2$; and the second indication amount $Q_2$ bits of the second portion are a sixth preset binary number; and the sixth preset binary number is different from a value of $((u+C)\%(2^{Q_1}-1))_{binary}$ when In an exemplary embodiment, the step of sending HARQ information through a first portion and a second portion of total feedback indication amount Q bits includes:

sending HARQ information to the HARQ information receiving end through bits with values which are 1 in the second indication amount $Q_2$ bits of the second portion.

In an exemplary embodiment, the total feedback indication amount Q is greater than or equal to $\lceil \log_2 (N-M+2) \rceil + M-1$; the first indication amount $Q_1$ is greater than or equal to $\lceil \log_2(N-M+2) \rceil$; and the second indication amount $Q_2$ is greater than or equal to $M-1$; or the total feedback indication amount Q is greater than or equal to $\lceil \log_2 (N) \rceil + M-1$; the first indication amount $Q_1$ is greater than or equal to $\lceil \log_2(N) \rceil$; and the second indication amount $Q_2$ is greater than or equal to $M-1$.

In an exemplary embodiment, when HARQ information about two groups or more than two groups with each group having M virtual continuous resources needs to be sent, the method further includes:

adding a preset number of bits to send resource group indexes of HARQ information feedback groups according to a number of groups of HARQ information which needs to be sent.

In another aspect, the embodiment of the present disclosure further provides a resource allocation method, including:

a resource allocation receiving end receiving information about resources allocated to the resource allocation receiving end itself sent through a first portion and a second portion of total indication amount Q bits; and determining the resources allocated to the resource allocation receiving end itself according to values of first indication amount $Q_1$ bits of the first portion and values of second indication amount $Q_2$ bits of the second portion.

In an exemplary embodiment, the step of determining the resources allocated to the resource allocation receiving end itself according to values of first indication amount $Q_1$ bits of the first portion and values of second indication amount $Q_2$ bits of the second portion includes:

when the value of the first portion is a second preset binary number, determining that resources corresponding to bits with values which are 1 in the second indication amount $Q_2$ bits of the second portion in resources with resource indexes being N−M+1, N−M+2 . . . N−1 are the resources allocated to the resource allocation receiving end itself; and when the value of the first portion is not the second preset binary number, determining an allocated smallest resource index $S_0$ according to a corresponding relation between the value of the first portion and resource indexes 0, . . N−M, and determining that resources corresponding to bits with values which are 1 in the second indication amount $Q_2$ bits of the second portion in resources with resource indexes being $S_0$+1, $S_0$+2 . . . $S_0$+M−1 are the resources allocated to the resource allocation receiving end itself.

In an exemplary embodiment, the step of determining the resources allocated to the resource allocation receiving end itself according to values of first indication amount $Q_1$ bits of the first portion and values of second indication amount $Q_2$ bits of the second portion includes:

when the value of the first portion is a fourth preset binary number, determining that resources corresponding to bits with values which are 1 in the second indication amount $Q_2$ bits of the second portion in resources with resource indexes being 0, 1 . . . M−2 are the resources allocated to the resource allocation receiving end itself; and when the value of the first portion is not the fourth preset binary number, determining an allocated largest resource index $S_{K-1}$ according to a corresponding relation between the value of the first portion and resource indexes M−1, M . . . N−1, and determining that resources corresponding to bits with values which are 1 in the second indication amount $Q_2$ bits of the second portion in resources with resource indexes being $S_{K-1}$−1, $S_{K-1}$−2 . . . $S_{K-1}$−M+1 are the resources allocated to the resource allocation receiving end itself.

In an exemplary embodiment, the step of determining the resources allocated to the resource allocation receiving end itself according to values of first indication amount $Q_1$ bits of the first portion and values of second indication amount $Q_2$ bits of the second portion includes:

determining the smallest resource index $S_0$ or the largest resource index $S_{K-1}$ of allocated resources according to the first indication amount $Q_1$ bits of the first portion and resource indexes 0, 1 . . . N−1;

when the smallest resource index $S_0$ of allocated resources is determined according to the first indication amount $Q_1$ bits of the first portion and resource indexes 0, 1 . . . N−1, determining the resources allocated to the resource allocation receiving end itself in resources with resource indexes being $S_0$+1, $S_0$+2 . . . $S_0$+M−1 according to bits with values which are 1 and are not a first preset binary number in the second indication amount $Q_2$ bits of the second portion; and when the largest resource index $S_{K-1}$ of allocated resources is determined according to the first indication amount $Q_1$ bits of the first portion and resource indexes 0, 1 . . . N−1, determining the resources allocated to the resource allocation receiving end itself in resources with resource indexes being $S_{K-1}$−1, $S_{K-1}$−2 . . . $S_{K-1}$−M+1 according to bits with values which are 1 and are not a second preset binary number in the second indication amount $Q_2$ bits of the second portion.

In another aspect, the embodiment of the present disclosure further provides an information feedback method, including:

an HARQ information receiving end receiving a feedback of HARQ information sent by an HARQ information sending end through a first portion and a second portion of total feedback indication amount Q bits; and determining detection results of HARQ information according to values of first indication amount $Q_1$ bits of the first portion and values of second indication amount $Q_2$ bits of the second portion.

In an exemplary embodiment, the step of determining detection results of HARQ information according to values of first indication amount $Q_1$ bits of the first portion and values of second indication amount $Q_2$ bits of the second portion includes:

when the value of the first portion is a sixth preset binary number, determining that detection results of HARQ information about resources corresponding to bits with values which are 1 in the second indication amount $Q_2$ bits of the second portion in resources with resource indexes being N−M+1, N−M+2 . . . N−1 are ACK; and when the value of the first portion is not the sixth preset binary number, determining an allocated smallest resource index $S_0$ according to a corresponding relation between the value of the first portion and resource indexes 0, 1 . . . N−M, and determining that detection results of HARQ information about resources corresponding to bits with values which are 1 in the second indication amount $Q_2$ bits of the second portion in resources with resource indexes being $S_0$+1, $S_0$+2 . . . $S_0$+M−1 are ACK.

In an exemplary embodiment, the step of determining to send the feedback of HARQ information to the sending end according to values of first indication amount $Q_1$ bits of the first portion and values of second indication amount $Q_2$ bits of the second portion includes:

when the value of the first portion is a ninth preset binary number, determining that detection results of HARQ information about resources corresponding to bits with values which are 1 in the second indication amount $Q_2$ bits of the second portion in resources with resource indexes being 0, 1 . . . M−2 are ACK; and when the value of the first portion is not the ninth preset binary number, determining an allocated largest resource index $S_{K-1}$ according to a corresponding relation between the value of the first portion and resource indexes M−1, M . . . N−1, and determining that detection results of HARQ information about resources corresponding to bits with values which are 1 in the second indication amount $Q_2$ bits of the second portion in resources with resource indexes being $S_{K-1}$−1, $S_{K-1}$−2 . . . $S_{K-1}$−M+1 are ACK.

In another aspect, the present application further provides a resource allocation device, including: a determination indication unit, configured to send information about resources allocated to a resource allocation receiving end to the resource allocation receiving end through a first portion and a second portion of total indication amount of Q bits, herein the first portion contains first indication amount $Q_1$ bits and the second portion contains second indication amount $Q_2$ bits, a number of resources allocated to the resource allocation receiving end is K, resource indexes corresponding to the K resources are $S_i$, i∈[0, 1, 2 . . . K−1], $S_i$<$S_{i+1}$, 1≤K≤M, and M is a number of virtual continuous resources allowed to be allocated by the resource allocation receiving end.

In an exemplary embodiment, the determination indication unit includes a value determination module and a determination indication module, wherein, the value determination module is configured to determine values of the first indication amount $Q_1$ bits of the first portion and values of the second indication amount $Q_2$ bits of the second portion according to a smallest resource index $S_0$ or a largest resource index $S_{K-1}$; and the determination indication module is configured to send information about resources allocated to the resource allocation receiving end to the resource allocation receiving end through the values of the first indication amount $Q_1$ bits of the first portion and the values of the second indication amount $Q_2$ bits of the second portion.

In an exemplary embodiment, the value determination module is configured to:

predetermine the values of the first indication amount $Q_1$ bits of the first portion and the values of the second indication amount $Q_2$ bits of the second portion according to the smallest resource index $S_0$; or predetermine the values of the first indication amount $Q_1$ bits of the first portion and the values of the second indication amount $Q_2$ bits of the second portion according to the largest resource index $S_{K-1}$.

In an exemplary embodiment, the value determination module is configured as that:

when $S_0 \leq N-M$, the first portion is a first preset binary number corresponding to the resource index $S_0$ and expressed by the first indication amount bits; when $S_0 \leq N-M$ and K=1, the values of the second indication amount $Q_2$ bits of the second portion are all 0;

when $S_0 \leq N-M$ and K>1, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, i=1, 2 \ldots K-1, a value of a bit corresponding to the resource index $S_i$ is 1 and values of other bits are 0; and when $S_0 > N-M$, the first portion is a second preset binary number expressed by the first indication amount $Q_1$ bits; and the second indication amount $Q_2$ bits of the second portion correspond to resources with resource indexes being N-M+1, N-M+2 \ldots N-1 one to one, and when $S_i \in \{N-M+1, N-M+2 \ldots N-1\}$, i=1, 2 \ldots K-1, a value of a bit corresponding to the resource index $S_i$ is 1 and values of other bits are 0, herein the first preset binary number is different from the second preset binary number.

In an exemplary embodiment, the value determination module is configured as that:

when $S_{K-1} \geq M-1$, a value of the first portion is a third preset binary number corresponding to the resource index $S_{K-1}$ and expressed by the first indication amount $Q_1$ bits;

when $S_{K-1} \geq M-1$ and K=1, the values of the second indication amount $Q_2$ bits of the second portion are all 0;

when $S_{K-1} \geq M-1$ and K>1, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, i=0, 1, \ldots K-2, a value of the second portion corresponding to the resource index $S_i$ is 1 and values of other bits are 0; and when $S_{K-1} < M-1$, the first portion is a fourth preset binary number expressed by the first indication amount $Q_1$ bits; and the second indication amount $Q_2$ bits of the second portion correspond to resources with resource indexes being 0, 1 \ldots M-2 one to one, and when $S_i \in \{0, 1 \ldots M-2\}$, i=0, 1 \ldots K-1, a value of a bit corresponding to the resource index $S_i$ is 1 and values of other bits are 0, herein the third preset binary number is different from the fourth preset binary number.

In an exemplary embodiment, the value determination module is configured as that:

a bit value of the first portion is a first preset binary number corresponding to the resource index $S_0$ and expressed by the first indication amount $Q_1$ bits; or a second preset binary number corresponding to the resource index $S_{K-1}$ and expressed by the first indication amount $Q_1$ bits.

In an exemplary embodiment, the value determination module is configured as that:

the first preset binary number is $((S_0+C)\%(2^{Q_1}-1))_{binary}$ or $(S_0)_{binary}$;

the second preset binary number is $((S_{K-1}+C)\%(2^{Q_1}-1))_{binary}$ or $(S_{K-1})_{binary}$;

where C is any integral constant, when the first preset binary number is $((S_0+C)\%(2^{Q_1}-1))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, i=1, 2 \ldots K-1, a value of a bit corresponding to the resource index $S_i$ is 1 and values of other bits are 0; and when the second preset binary number is $((S_{K-1}+C)\%(2^{Q_1}-1))_{binary}$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-2} \ldots S_{K-1}-M+1\}$, i=0, 1 \ldots K-2, a value of the second portion corresponding to the resource index $S_i$ is 1 and values of other bits are 0.

In an exemplary embodiment, the determination indication module is configured to:

indicate that resources corresponding to bits with values which are 1 are the resources allocated to the resource allocation receiving end through the bits with values which are 1 in the second indication amount $Q_2$ bits of the second portion.

In an exemplary embodiment, the device further includes a resource group indication unit configured to, when two groups or more than two groups with each group having M virtual continuous resources need to be allocated, add a preset number of bits to indicate resource group indexes of allocated resource groups according to a number of groups of resources which need to be allocated.

In another aspect, the embodiment of the present disclosure further provides an information feedback device, including a feedback indication unit, configured to send Hybrid Automatic Repeat Request (HARQ) information through a first portion and a second portion of total feedback indication amount Q bits, herein the first portion contains first indication amount $Q_1$ bits and the second portion contains second indication amount $Q_2$ bits, a number of detection results which are ACK in the HARQ information is K, $0 \leq K \leq M$, a resource index corresponding to an ith ACK is allocated to be $S_i$, herein i∈[0, 1, 2 \ldots K-1], $S_i < S_i+1$ and M is a maximum number of virtual continuous resources about which HARQ information is allowed to be fed back by an HARQ information receiving end.

In an exemplary embodiment, the feedback indication unit includes a feedback assignment module and a feedback indication module, herein, the feedback assignment module is configured to, according to a resource index SO corresponding to a 0th ACK or a resource index SK−1 corresponding to a (K−1)th ACK, determine values of the first indication amount $Q_1$ bits of the first portion and values of the second indication amount $Q_2$ bits of the second portion of the total feedback indication amount Q bits; and the feedback indication module is configured to send HARQ information through the values of the first indication amount $Q_1$ bits of the first portion and the values of the second indication amount $Q_2$ bits of the second portion.

In an exemplary embodiment, the feedback assignment module is configured to:

predetermine the values of the first indication amount $Q_1$ bits of the first portion and the values of the second indication amount $Q_2$ bits of the second portion according to the resource index $S_0$; or predetermine the values of the first indication amount $Q_1$ bits of the first portion and the values of the second indication amount $Q_2$ bits of the second portion according to the resource index $S_{K-1}$.

In an exemplary embodiment, the feedback assignment module is configured as that:

when $K \neq 0$ and $S_0 \leq N-M$, the first portion is a fifth preset binary number corresponding to the resource index $S_0$ and expressed by the first indication amount $Q_1$ bits;

when $K=1$ and $S_0 \leq N-M$, the values of the second indication amount $Q_2$ bits of the second portion are all 0;

when $K>1$ and $S_0 \leq N-M$, the values of the second indication amount $Q_2$ bits of the second portion correspond to resources with resource indexes being $S_0+1$, $S_0+2$ ... $S_0+M-1$ one to one, and when $S_s \in \{S_0+1, S_0+2 \ldots S_0+M-1\}$, $i=1, 2 \ldots K-1$, a value of a bit corresponding to the resource index $S_i$ is 1 and values of other bits are 0;

when $K \neq 0$ and $S_0 > N-M$, the first portion is a sixth preset binary number expressed by the first indication amount $Q_1$ bits;

when $S_0 > N-M$, the second indication amount $Q_2$ bits of the second portion correspond to resources with resource indexes being $N-M+1$, $N-M+2$ ... $N-1$ one to one, and when $S_i \in \{N-M+1, N-M+2 \ldots N-1\}$, $i=1, 2 \ldots K-1$, a value of a bit corresponding to the resource index $S_i$ is 1 and values of other bits are 0; and when $K=0$, the first portion is a seventh preset binary number expressed by the first indication amount $Q_1$ bits, herein every two of the fifth preset binary number, the sixth preset binary number and the seventh preset binary number are different.

In an exemplary embodiment, the feedback assignment module is configured as that:

when $K \neq 0$ and $S_{K-1} \geq M-1$, the first portion is an eighth preset binary number corresponding to the resource index $S_{K-1}$ and expressed by the first indication amount $Q_1$ bits;

when $S_{K-1} \geq M-1$ and $K=1$, the values of the second indication amount $Q_2$ bits of the second portion are all 0;

when $S_{K-1} \geq M-1$ and $K>1$, the values of the second indication amount $Q_2$ bits of the second portion correspond to resources with resource indexes being $S_{K-1}-1$, $S_{K-1}-2$ ... $S_{K-1}-M+1$ one to one, and when $S_i \in \{S_{K-1}-1, S_{K-1}-2 \ldots S_{K-1}-M+1\}$, $i=0, 1, \ldots K-2$, a value of a bit corresponding to the resource index $S_i$ is 1 and values of other bits are 0;

when $K \neq 0$ and $S_{K-1} < M-1$, the value of the first portion is a ninth preset binary number expressed by the first indication amount $Q_1$ bits;

when $K=0$, the first portion is a tenth preset binary number expressed by the first indication amount $Q_1$ bits; and when $S_{K-1} < M-1$, the values of the second indication amount $Q_2$ bits of the second portion correspond to resources with resource indexes being 0, 1 ... M-2 one to one, and when $S_i \in \{0, 1 \ldots M-2\}$, $i=0, 1 \ldots K-1$, a value of a bit corresponding to the resource index $S_i$ is 1 and values of other bits are 0, wherein every two of the eighth preset binary number, the ninth preset binary number and the tenth preset binary number are different.

In an exemplary embodiment, the feedback assignment module is configured to:

assign a third preset binary number corresponding to the resource index $S_0$ and expressed by the first indication amount $Q_1$ bits, or a fourth preset binary number corresponding to the resource index $S_{K-1}$ and expressed by the first indication amount $Q_1$ bits, to a bit value of the first portion.

In an exemplary embodiment, the feedback assignment module is configured as that:

the third preset binary number is $((S_0+C)\%(2^{Q_1}-1))_{binary}$ or $(S_0)_{binary}$;

the fourth preset binary number is $((S_{K-1}+C)\%(2^{Q_1}-1))_{binary}$ or $(S_{K-1})_{binary}$, where C is any integral constant, when $K \neq 0$ and the first preset binary number is $((S_0+C)\%(2^{Q_1}-1))_{binary}$, the second indication amount $Q_2$ bits of the second portion correspond to resources with resource indexes being $S_0+1$, $S_0+2$ ... $S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0;

when the second preset binary number is $((S_{K-1}+C)\%(2^{Q_1}-1))_{binary}$, the second indication amount $Q_2$ bits of the second portion correspond to resources with resource indexes being $S_{K-1}-1$, $S_{K-1}-2$ ... $S_{K-1}-M+1$ one to one, and when $S_i \in \{S_{K-1}-1, S_{K-1}-2 \ldots S_{K-1}-M+1\}$, $i=0, 1 \ldots K-2$, a value of the second portion corresponding to the resource index $S_i$ is 1 and values of other bits are 0;

when $K=0$ and the first preset binary number is $((S_0+C)\%(2^{Q_1}-1))_{binary}$, a bit value of the first portion is $((u+C)\%(2^{Q_1}-1))_{binary}$, herein $N-M \leq u < N$ and u is a positive integer; and the second indication amount $Q_2$ bits of the second portion are a fifth preset binary number;

the fifth preset binary number is different from a value of $((u+C)\%(2^{Q_1}-1))_{binary}$ when $K=0$;

when $K \neq 0$ and the first preset binary number is $((S_{K-1}+C)\%(2^{Q_1}-1))_{binary}$, a bit value of the first portion is $((u+C)\%(2^{Q_1}-1))_{binary}$, wherein u is an integer and $0 \leq u < M-2$; and the second indication amount $Q_2$ bits of the second portion are a sixth preset binary number; and the sixth preset binary number is different from a value of $((u+C)\%(2^{Q_1}-1))_{binary}$ when $K \neq 0$.

In an exemplary embodiment, the feedback indication module is configured to:

send HARQ information to the HARQ information receiving end through bits with values which are 1 in the second indication amount $Q_2$ bits of the second portion.

In an exemplary embodiment, the device further includes a feedback resource group indication unit configured to, when HARQ information about two groups or more than two groups with each group having M virtual continuous resources needs to be sent, add a preset number of bits to send resource group indexes of HARQ information feedback groups according to a number of groups of HARQ information which needs to be sent.

In another aspect, the embodiment of the present disclosure further provides a resource allocation device, including: a receiving unit and a determination unit, herein, the receiving unit is configured to receive information about resources allocated to the resource allocation device itself sent through a first portion and a second portion of total indication amount Q bits; and the determination unit is configured to determine the resources allocated to the resource allocation device itself according to values of first indication amount $Q_1$ bits of the first portion and values of second indication amount $Q_2$ bits of the second portion.

In an exemplary embodiment, the determination unit is configured to:

when the value of the first portion is a second preset binary number, determine that resources corresponding to bits with values which are 1 in the second indication amount $Q_2$ bits of the second portion in resources with resource indexes N−M+1, N−M+2 . . . N−1 are the resources allocated to the resource allocation device itself; and when the value of the first portion is not the second preset binary number, determine an allocated smallest resource index $S_0$ according to a corresponding relation between the value of the first portion and resource indexes 0, 1 . . . N−M, and determine that resources corresponding to bits with values which are 1 in the second indication amount $Q_2$ bits of the second portion in resources with resource indexes being $S_0+1$, $S_0+2$ . . . $S_0+M-1$ are the resources allocated to the resource allocation device itself.

In an exemplary embodiment, the determination unit is configured to:

when the value of the first portion is a fourth preset binary number, determine that resources corresponding to bits with values which are 1 in the second indication amount $Q_2$ bits of the second portion in resources with resource indexes being 0, 1 . . . M−2 are the resources allocated to the resource allocation device itself; and when the value of the first portion is not the fourth preset binary number, determine an allocated largest resource index $S_{K-1}$ according to a corresponding relation between the value of the first portion and resource indexes M−1, M . . . N−1, and determine that resources corresponding to bits with values which are 1 in the second indication amount $Q_2$ bits of the second portion in resources with resource indexes being $S_{K-1}-1$, $S_{K-1}-2$ . . . $S_{K-1}-M+1$ are the resources allocated to the resource allocation device itself.

In an exemplary embodiment, the determination unit is configured to:

determine the smallest resource index $S_0$ or the largest resource index $S_{K-1}$ of allocated resources according to the first indication amount $Q_1$ bits of the first portion and resource indexes 0, 1 . . . N−1;

when the smallest resource index $S_0$ of allocated resources is determined according to the first indication amount $Q_1$ bits of the first portion and resource indexes 0, 1 . . . N−1, determine the resources allocated to the resource allocation device itself in resources with resource indexes being $S_0+1$, $S_0+2$ . . . $S_0+M-1$ according to bits with values which are 1 and are not a first preset binary number in the second indication amount $Q_2$ bits of the second portion; and when the largest resource index $S_{K-1}$ of allocated resources is determined according to the first indication amount $Q_1$ bits of the first portion and resource indexes 0, 1 . . . N−1, determine the resources allocated to the resource allocation device in resources with resource indexes being $S_{K-1}-1$, $S_{K-1}-2$ . . . $S_{K-1}-M+1$ according to bits with values which are 1 and are not a second preset binary number in the second indication amount $Q_2$ bits of the second portion.

In another aspect, the embodiment of the present disclosure further provides an information feedback device, including a feedback receiving unit and a determination feedback unit, herein, the feedback receiving unit is configured to receive a feedback of HARQ information sent by an HARQ information sending end through a first portion and a second portion of total feedback indication amount Q bits; and the determination feedback unit is configured to determine to send an HARQ information feedback to the sending end according to values of first indication amount $Q_1$ bits of the first portion and values of second indication amount $Q_2$ bits of the second portion.

In an exemplary embodiment, the determination feedback unit is configured to:

when the value of the first portion is a sixth preset binary number, determine that detection results of HARQ information about resources corresponding to bits with values which are 1 in the second indication amount $Q_2$ bits of the second portion in resources with resource indexes being N−M+1, N−M+2 . . . N−1 are ACK, and feed back the detection results to the sending end; and when the value of the first portion is not the sixth preset binary number, determine an allocated smallest resource index $S_0$ according to a corresponding relation between the value of the first portion and resource indexes 0, 1 . . . N−M, determine that detection results of HARQ information about resources corresponding to bits with values which are 1 in the second indication amount $Q_2$ bits of the second portion in resources with resource indexes being $S_0+1$, $S_0+2$ . . . $S_0+M-1$ are ACK, and feed back the detection results to the sending end.

In an exemplary embodiment, the determination feedback unit is configured to:

when the value of the first portion is a ninth preset binary number, determine that detection results of HARQ information about resources corresponding to bits with values which are 1 in the second indication amount $Q_2$ bits of the second portion in resources with resource indexes being 0, 1 . . . M−2 are ACK, and feed back the detection results to the sending end; and when the value of the first portion is not the ninth preset binary number, determine an allocated largest resource index $S_{K-1}$ according to a corresponding relation between the value of the first portion and resource indexes M−1, M . . . N−1, determine that detection results of HARQ information about resources corresponding to bits with values which are 1 in the second indication amount $Q_2$ bits of the second portion in resources with resource indexes being $S_{K-1}-1$, $S_{K-1}-2$ . . . $S_{K-1}-M+1$ are ACK, and feed back the detection results to the sending end.

As compared with the existing technology, the scheme provided by the embodiment of the present disclosure includes that: a resource allocation sending end sends information about resources allocated to a resource allocation receiving end to the resource allocation receiving end through a first portion and a second portion of total indication amount Q bits, the first portion contains first indication amount $Q_1$ bits and the second portion contains second indication amount $Q_2$ bits, the number of resources allocated to the resource allocation receiving end is K, resource indexes corresponding to the K resources are $S_i$, i∈[0, 1, 2 . . . K−1], $S_i<S_{i+1}$, 1≤K≤M, and M is the number of virtual continuous resources allowed to be allocated by the resource allocation receiving end. In the embodiments of the present disclosure, by performing resource allocation indication through the first portion and the second portion of the total indication amount Q bits, the overhead in the process of resource allocation is reduced and flexible resource allocation indication is realized.

After reading and understanding the drawings and the detailed description, other aspects may be understood.

BRIEF DESCRIPTION OF DRAWINGS

FIG. 1 illustrates a flowchart of a resource allocation method according to the embodiment of the present disclosure.

FIG. 2 illustrates a flowchart of an information feedback method according to the embodiment of the present disclosure.

FIG. 3 illustrates a flowchart of another resource allocation method according to the embodiment of the present disclosure.

DETAILED DESCRIPTION

Figure 4:
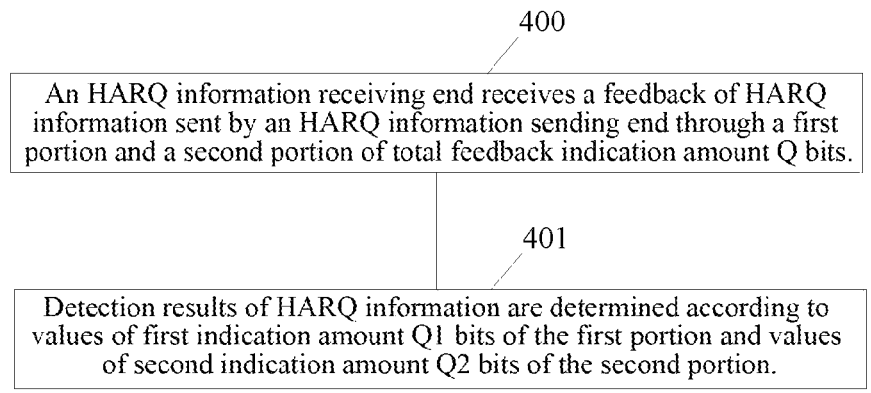
FIG. 4 illustrates a flowchart of another information feedback method according to the embodiment of the present disclosure.

The embodiments of the present application will be described below in detail with reference to the drawings. It needs to be stated that the embodiments in the present application and the features in the embodiments may be mutually and freely combined under a situation of no conflict.

FIG. 1 illustrates a flowchart of a resource allocation method according to the embodiment of the present disclosure. As illustrated in FIG. 1, the method includes the following step 100.

In step 100, a resource allocation sending end sends information about resources allocated to a resource allocation receiving end to the resource allocation receiving end through a first portion and a second portion of total indication amount Q bits.

Herein, the first portion contains first indication amount $Q_1$ bits and the second portion contains second indication amount $Q_2$ bits. The number of resources allocated to the resource allocation receiving end is K, resource indexes corresponding to the K resources are $S_i$, $i \in [0, 1, 2 \ldots K-1]$, $S_i < S_{i+1}$, $1 \leq K \leq M$, and M is the number of virtual continuous resources allowed to be allocated by the resource allocation receiving end.

In the method provided by the present disclosure, the M virtual continuous resources are any virtual continuous resources in resources with the total number of N, resource indexes of the resources with the total number of N are sequentially 0, 1 ... N−1, and M is a positive integer greater than or equal to 2.

The step of sending information about resources allocated to a resource allocation receiving end to the resource allocation receiving end through a first portion and a second portion of total indication amount Q bits includes:

determining values of the first indication amount $Q_1$ bits of the first portion and values of the second indication amount $Q_2$ bits of the second portion according to a smallest resource index $S_0$ or a largest resource index $S_{K-1}$; and sending information about resources allocated to the resource allocation receiving end to the resource allocation receiving end through the values of the first indication amount $Q_1$ bits of the first portion and the values of the second indication amount $Q_2$ bits of the second portion.

The step of determining values of the first indication amount $Q_1$ bits of the first portion and values of the second indication amount $Q_2$ bits of the second portion includes:

predetermining the values of the first indication amount $Q_1$ bits of the first portion and the values of the second indication amount $Q_2$ bits of the second portion according to the smallest resource index $S_0$; or predetermining the values of the first indication amount $Q_1$ bits of the first portion and the values of the second indication amount $Q_2$ bits of the second portion according to the largest resource index $S_{K-1}$.

In an implementation mode, the scheme for determining values according to the smallest resource index $S_0$ includes that:

when $S_0 \leq N-M$, the first portion is a first preset binary number corresponding to the resource index $S_0$ and expressed by the first indication amount $Q_1$ bits;

when $S_0 \leq N-M$ and K=1, the values of the second indication amount $Q_2$ bits of the second portion are all 0;

when $S_0 \leq N-M$ and K>1, the second indication amount $Q_2$ bits of the second portion correspond to resources with resource indexes being $S_0+1$, $S_0+2 \ldots S_0+M-1$ one to one, and when $S_i \in \{S_0+1, S_0+2 \ldots S_0+M-1\}$, i=1, 2 ... K−1, a value of a bit corresponding to the resource index $S_i$ is 1 and values of other bits are 0; and when $S_0 > N-M$, the first portion is a second preset binary number expressed by the first indication amount $Q_1$ bits; and the second indication amount $Q_2$ bits of the second portion correspond to resources with resource indexes being N−M+1, N−M+2 ... N−1 one to one, and when $S_i \in \{N-M+1, N-M+2 \ldots N-1\}$, i=0, 1, 2 ... K−1, a value of a bit corresponding to the resource index $S_i$ is 1 and values of other bits are 0, herein the first preset binary number is different from the second preset binary number.

Here, the first preset binary number expressed by the first indication amount $Q_1$ bits is $((S_0+C)\%(2^{Q_1}-1))_{binary}$ or $(S_0)_{binary}$, where C is any integral constant.

A scheme for determining values according to the smallest resource index $S_{K-1}$ includes that:

when $S_{K-1} \geq M-1$, a value of the first portion is a third preset binary number corresponding to the resource index $S_{K-1}$ and expressed by the first indication amount $Q_1$ bits;

when $S_{K-1} \geq M-1$ and K=1, the values of the second indication amount $Q_2$ bits of the second portion are all 0;

when $S_{K-1} \geq M-1$ and K>1, the second indication amount $Q_2$ bits of the second portion correspond to resources with resource indexes being $S_{K-1}-1$, $S_{K-1}-2 \ldots S_{K-1}-M+1$ one to one, and when $S_i \in \{S_{K-1}-1, S_{K-1}-2 \ldots S_{K-1}-M+1\}$, i=0, 1, ... K−2, a value of the second portion corresponding to the resource index $S_i$ is 1 and values of other bits are 0; and when $S_{K-1} < M-1$, the first portion is a fourth preset binary number expressed by the first indication amount $Q_1$ bits; and the second indication amount $Q_2$ bits of the second portion correspond to resources with resource indexes being 0, 1 ... M−2 one to one, and when $S_i \in \{0, 1 \ldots M-2\}$, i=0, 1 ... K−1, a value of a bit corresponding to the resource index $S_i$ is 1 and values of other bits are 0, herein the third preset binary number is different from the fourth preset binary number.

Here, the third preset binary number expressed by the first indication amount $Q_1$ bits is $((S_{K-1}+C)\%(2^{Q_1}-1))_{binary}$ or $(S_{K-1})_{binary}$, where C is any integral constant.

In another case, a bit value of the first portion is a first preset binary number corresponding to the resource index $S_0$ and expressed by the first indication amount $Q_1$ bits; or a second preset binary number corresponding to the resource index $S_{K-1}$ and expressed by the first indication amount $Q_1$ bits.

In an implementation mode, the first preset binary number is $((S_0+C)\%(2^{Q_1}-1))_{binary}$ or $(S_0)_{binary}$; the second preset binary number is $((S_{K-1}+C)\%(2^{Q_1}-1))_{binary}$ or $(S_{K-1})_{binary}$, where C is any integral constant.

When the first preset binary number is $((S_0+C)\%(2^{Q_1}))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0. When the second preset binary number is $((S_{K-1}+C)\%(2^{Q_1}-1))_{binary}$, the second indication amount $Q_2$ bits of the second portion correspond to resources with resource indexes being $S_{K-1}-1$, one to one, and when $S_i \in \{S_{K-1}-1, S_{K-1}-2 \ldots S_{K-1}-M+1\}$, $i=0, 1 \ldots K-2$, a value of the second portion corresponding to the resource index $S_i$ is 1 and values of other bits are 0.

In an implementation mode, when the first preset binary number is $((S_0+C)\%(2^{Q_1}-1))_{binary}$, for the other bits with values which are not 1 in the second indication amount $Q_2$ bits of the second portion, when $S_0+i>N-1$, $i=1, 2 \ldots M-1$, a value of a bit corresponding to $S_0+i$ is the first preset binary number; and when the second preset binary number is $((S_{K-1}+C)\%(2^{Q_1}-1))_{binary}$, for the other bits with values which are not 1 in the second indication amount $Q_2$ bits of the second portion, when $S_{K-1}-1<0$, $i=1, 2 \ldots M-1$, a value of a bit corresponding to $S_{K-1}-1$ is the second preset binary number.

In the method provided by the embodiment of the present disclosure, the step of sending information about resources allocated to a receiving end to the receiving end includes:

indicating that resources corresponding to bits with values which are 1 are the resources allocated to the resource allocation receiving end through the bits with values which are 1 in the second indication amount $Q_2$ bits of the second portion.

In the method provided by the embodiment of the present disclosure, the total indication amount Q is greater than or equal to $\lceil \log_2(N-M+2) \rceil + M-1$; the first indication amount $Q_1$ is greater than or equal to $\lceil \log_2(N-M+2) \rceil$; and the second indication amount $Q_2$ is greater than or equal to $M-1$; or the total indication amount Q is greater than or equal to $\lceil \log_2(N) \rceil + M-1$; the first indication amount $Q_1$ is greater than or equal to $\lceil \log_2(N) \rceil$; and the second indication amount $Q_2$ is greater than or equal to $M-1$.

It needs to be stated that, when Q, $Q_1$ and $Q_2$ are equal, the needed bit overhead is the least and at this moment the saved overhead is the most.

The method provided by the embodiment of the present disclosure further includes the following step. When two groups or more than two groups with each group having M virtual continuous resources need to be allocated, a preset number of bits are added to indicate resource group indexes of allocated resource groups according to the number of groups of resources which need to be allocated. Here, supposing that there are P groups with each group having M virtual continuous resources (P is a positive integer greater than 1), some bits are added and configured to indicate resource groups indexes. Supposing P=5, $\lceil \log_2(5) \rceil = 3$ bits may be added, 000 is used for indicating a resource group index 0, 001 is used for indicating a resource group index 1 ... 101 is used for indicating a resource group index 4, etc. It needs to be stated that, for the allocation indication method of M virtual continuous resources in each resource group, the above-mentioned method provided by the embodiment of the present disclosure is still adopted for processing.

FIG. 2 illustrates a flowchart of an information feedback method according to the embodiment of the present disclosure. As illustrated in FIG. 2, the method includes the following step 200.

In step 200, an HARQ information sending end sends Hybrid Automatic Repeat Request (HARQ) information through a first portion and a second portion of total feedback indication amount Q bits.

The first portion contains first indication amount $Q_1$ bits and the second portion contains second indication amount $Q_2$ bits. Herein the number of detection results which are ACK in the HARQ information is K, $0 \leq K \leq M$, a resource index corresponding to an ith ACK is allocated to be $S_i$, where $i \in [0, 1, 2 \ldots K-1]$, $S_i < S_i+1$ and M is the maximum number of virtual continuous resources about which HARQ information is allowed to be fed back by an HARQ information receiving end.

In the method provided by the embodiment of the present disclosure, the M virtual continuous resources are any virtual continuous resources in resources with the total number of N. Herein resource indexes of the resources with the total number of N are sequentially 0, 1 ... N−1, and M is a positive integer greater than or equal to 2.

The step of sending Hybrid Automatic Repeat Request (HARQ) information through a first portion and a second portion of total indication amount Q bits includes:

according to a resource index $S_0$ corresponding to a 0th ACK or a resource index $S_{K-1}$ corresponding to a (K−1)th ACK, determining values of the first indication amount $Q_1$ bits of the first portion and values of the second indication amount $Q_2$ bits of the second portion of the total feedback indication amount Q bits; and sending HARQ information through the values of the first indication amount $Q_1$ bits of the first portion and the values of the second indication amount $Q_2$ bits of the second portion.

The step of determining values of the first indication amount $Q_1$ bits of the first portion and values of the second indication amount $Q_2$ bits of the second portion includes:

predetermining the values of the first indication amount $Q_1$ bits of the first portion and the values of the second indication amount $Q_2$ bits of the second portion according to the resource index $S_0$; or predetermining the values of the first indication amount $Q_1$ bits of the first portion and the values of the second indication amount $Q_2$ bits of the second portion according to the resource index $S_{K-1}$.

Embodiments for determining values according to the resource index $S_0$ may include that:

when $K \neq 0$ and $S_0 \leq N-M$, the first portion is a fifth preset binary number corresponding to the resource index $S_0$ and expressed by the first indication amount $Q_1$ bits;

when K=1 and $S_0 \leq N-M$, the values of the second indication amount $Q_2$ bits of the second portion are all 0;

when K>1 and $S_0 \leq N-M$, the values of the second indication amount $Q_2$ bits of the second portion correspond to resources with resource indexes being $S_0+1, S_0+2 \ldots S_0+M-1$ one to one, and when $S_S \in \{S_0+1, S_0+2 \ldots S_0+M-1\}$, i=1, 2 … K-1, a value of a bit corresponding to the resource index $S_i$ is 1 and values of other bits are 0;

when $K \neq 0$ and $S_0 > N-M$, the first portion is a sixth preset binary number expressed by the first indication amount $Q_1$ bits;

when $S_0 > N-M$, the second indication amount $Q_2$ bits of the second portion correspond to resources with resource indexes being N-M+1, N-M+2 … N-1 one to one, and when $S_i \in \{N-M+1, N-M+2 \ldots N-1\}$, i=1, 2 … K-1, a value of a bit corresponding to the resource index $S_i$ is 1 and values of other bits are 0; and when K=0, the first portion is a seventh preset binary number expressed by the first indication amount $IQ_1$ bits, where every two of the fifth preset binary number, the sixth preset binary number and the seventh preset binary number are different.

Here, the fifth preset binary number expressed by the first indication amount $Q_1$ bits is $((S_0+C)\%(2^{Q_1}-1))_{binary}$ or $(S_0)_{binary}$, where C is any integral constant.

A scheme of the embodiment for determining values according to $S_{K-1}$ includes that:

when $K \neq 0$ and $S_{K-1} \geq M-1$, the first portion is an eighth preset binary number corresponding to the resource index $S_{K-1}$ and expressed by the first indication amount $Q_1$ bits;

when $S_{K-1} \geq M-1$ and K=1, the values of the second indication amount $Q_2$ bits of the second portion are all 0;

when $S_{K-1} \geq M-1$ and K>1, the values of the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, i=0, 1, … K-2, a value of a bit corresponding to the resource index $S_i$ is 1 and values of other bits are 0;

when $K \neq 0$ and $S_{K-1} < M-1$, the value of the first portion is a ninth preset binary number expressed by the first indication amount $Q_1$ bits;

when K=0, the first portion is a tenth preset binary number expressed by the first indication amount $Q_1$ bits; and when $S_{K-1} < M-1$, the values of the second indication amount $Q_2$ bits of the second portion correspond to resources with resource indexes being 0, 1 … M-2 one to one, and when $S_i \in \{0, 1 \ldots M-2\}$, i=0, 1 … K-1, a value of a bit corresponding to the resource index $S_i$ is 1 and values of other bits are 0, herein every two of the eighth preset binary number, the ninth preset binary number and the tenth preset binary number are different.

Here, the eighth preset binary number expressed by the first indication amount $Q_1$ bits is $((S_{K-1}+C)\%(2^{Q_1}-1))_{binary}$ or $(S_{K-1})_{binary}$, where C is any integral constant.

In addition to the above-mentioned two schemes, the following method of an embodiment may also be adopted.

A bit value of the first portion is a third preset binary number corresponding to the resource index $S_0$ and expressed by the first indication amount $Q_1$ bits; or a fourth preset binary number corresponding to the resource index $S_{K-1}$ and expressed by the first indication amount $Q_1$ bits.

In an implementation mode, the third preset binary number is $((S_0+C)\%(2^{Q_1}-1))_{binary}$ or $(S_0)_{binary}$; the fourth preset binary number is $((S_{K-1}+C)\%(2^{Q_1}-1))_{binary}$ or $(S_{K-1})_{binary}$, where C is any integral constant.

When $K \neq 0$ and the first preset binary number is $((S_0+C)\%(2^{Q_1}-1))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, i=1, 2 … K-1, a value of a bit corresponding to the resource index $S_i$ is 1 and values of other bits are 0.

When the second preset binary number is $((S_{K-1}+C)\%(2^{Q_1}-1))_{binary}$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, i=0, 1 … K-2, a value of the second portion corresponding to the resource index $S_i$ is 1 and values of other bits are 0.

When K=0 and the first preset binary number is $((S_0+C)\%(2^{Q_1}-1))_{binary}$ a bit value of the first portion is $((u+C)\%(2^{Q_1}-1))_{binary}$, herein $N-M \leq u < N$ and u is a positive integer; and the second indication amount $Q_2$ bits of the second portion are a fifth preset binary number.

The fifth preset binary number is different from a value of $((u+C)\%(2^{Q_1}-1))_{binary}$ when K=0.

When $K \neq 0$ and the first preset binary number is $((S_{K-1}+C)\%(2^{Q_1}-1))_{binary}$, a bit value of the first portion is $((u+C)\%(2^{Q_1}-1))_{binary}$, where u is an integer and $0 \leq u < M-2$; and the second indication amount $Q_2$ bits of the second portion are a sixth preset binary number.

The sixth preset binary number is different from a value of $((u+C)\%(2^{Q_1}-1))_{binary}$ when $K \neq 0$.

In the embodiment of the present disclosure, the step of sending HARQ information through a first portion and a second portion of total feedback indication amount Q bits includes:

sending HARQ information to the HARQ information receiving end through bits with values which are 1 in the second indication amount $Q_2$ bits of the second portion.

In the method provided by the embodiment of the present disclosure, the total feedback indication amount Q is greater than or equal to $\lceil \log_2 (N-M+2) \rceil + M-1$; the first indication amount $Q_1$ is greater than or equal to $\lceil \log_2 (N-M+2) \rceil$; and the second indication amount $Q_2$ is greater than or equal to M-1; or the total feedback indication amount Q is greater than or equal to $\lceil \log_2(N) \rceil + M-1$; the first indication amount $Q_1$ is greater than or equal to $\lceil \log_2(N) \rceil$; and the second indication amount $Q_2$ is greater than or equal to M-1.

When HARQ information about two groups or more than two groups with each group having M virtual continuous resources needs to be sent, the method further includes the following step: a preset number of bits are added to send resource group indexes of HARQ information feedback groups according to the number of groups of HARQ information which needs to be sent.

FIG. 3 illustrates a flowchart of another resource allocation method according to the embodiment of the present disclosure. As illustrated in FIG. 3, the method includes the following steps 300-301.

In step 300, a resource allocation receiving end receives information about resources allocated to the resource allocation receiving end itself sent through a first portion and a second portion of total indication amount Q bits.

In step 301, the resources allocated to the resource allocation receiving end itself are determined according to values of first indication amount $Q_1$ bits of the first portion and values of second indication amount $Q_2$ bits of the second portion.

The step of determining the resources allocated to the resource allocation receiving end itself according to values of first indication amount $Q_1$ bits of the first portion and values of second indication amount $Q_2$ bits of the second portion includes:

when the value of the first portion is a second preset binary number, determining that resources corresponding to bits with values which are 1 in the second indication amount $Q_2$ bits of the second portion in resources with resource indexes being N−M+1, N−M+2 ... N−1 are the resources allocated to the resource allocation receiving end itself; and when the value of the first portion is not the second preset binary number, determining an allocated smallest resource index $S_0$ according to a corresponding relation between the value of the first portion and resource indexes 0, 1 ... N−M, and determining that resources corresponding to bits with values which are 1 in the second indication amount $Q_2$ bits of the second portion in resources with resource indexes being $S_0+1$, $S_0+2$ ... $S_0+M-1$ are the resources allocated to the resource allocation receiving end itself.

In another case, the step of determining the resources allocated to the resource allocation receiving end itself according to values of first indication amount $Q_1$ bits of the first portion and values of second indication amount $Q_2$ bits of the second portion includes:

when the value of the first portion is a fourth preset binary number, determining that resources corresponding to bits with values which are 1 in the second indication amount $Q_2$ bits of the second portion in resources with resource indexes 0, 1 ... M−2 are the resources allocated to the resource allocation receiving end itself; and when the value of the first portion is not the fourth preset binary number, determining an allocated largest resource index $S_{K-1}$ according to a corresponding relation between the value of the first portion and resource indexes M−1, M ... N−1, and determining that resources corresponding to bits with values which are 1 in the second indication amount $Q_2$ bits of the second portion in resources with resource indexes being $S_{K-1}-1$, $S_{K-1}-2$ ... $S_{K-1}-M+1$ are the resources allocated to the resource allocation receiving end itself.

The step of determining the resources allocated to the resource allocation receiving end itself according to values of first indication amount $Q_1$ bits of the first portion and values of second indication amount $Q_2$ bits of the second portion includes:

determining the smallest resource index $S_0$ or the largest resource index $S_{K-1}$ of allocated resources according to the first indication amount $Q_1$ bits of the first portion and resource indexes 0, 1 ... N−1;

when the smallest resource index $S_0$ of allocated resources is determined according to the first indication amount $Q_1$ bits of the first portion and resource indexes 0, 1 ... N−1, determining the resources allocated to the resource allocation receiving end itself in resources with resource indexes being $S_0+1$, $S_0+2$ ... $S_0+M-1$ according to bits with values which are 1 and are not a first preset binary number in the second indication amount $Q_2$ bits of the second portion; and when the largest resource index $S_{K-1}$ of allocated resources is determined according to the first indication amount $Q_1$ of the first portion and resource indexes 0, 1 ... N−1, determining the resources allocated to the resource allocation receiving end itself in resources with resource indexes being $S_{K-1}-1$, $S_{K-1}-2$ ... $S_{K-1}-M+1$ according to bits with values which are 1 and are not a second preset binary number in the second indication amount $Q_2$ bits of the second portion.

FIG. 4 illustrates a flowchart of another information feedback method according to the embodiment of the present disclosure. As illustrated in FIG. 4, the method includes the following steps 400 and 401.

In step 400, an HARQ information receiving end receives a feedback of HARQ information sent by an HARQ information sending end through a first portion and a second portion of total feedback indication amount Q bits.

In step 401, detection results of HARQ information are determined according to values of first indication amount $Q_1$ bits of the first portion and values of second indication amount $Q_2$ bits of the second portion.

The step of determining detection results of HARQ information according to values of first indication amount $Q_1$ bits of the first portion and values of second indication amount $Q_2$ bits of the second portion includes:

when the value of the first portion is a sixth preset binary number, determining that detection results of HARQ information about resources corresponding to bits with values which are 1 in the second indication amount $Q_2$ bits of the second portion in resources with resource indexes being N−M+1, N−M+2 ... N−1 are ACK;

when the value of the first portion is not the sixth preset binary number, determining an allocated smallest resource index $S_0$ according to a corresponding relation between the value of the first portion and resource indexes 0, 1 ... N−M, and determining that detection results of HARQ information about resources corresponding to bits with values which are 1 in the second indication amount $Q_2$ bits of the second portion in resources with resource indexes being $S_0+1$, $S_0+2$ ... $S_0+M-1$ are ACK;

or when the value of the first portion is a ninth preset binary number, determining that detection results of HARQ information about resources corresponding to bits with values which are 1 in the second indication amount $Q_2$ bits of the second portion in resources with resource indexes being 0, 1 ... M−2 are ACK;

when the value of the first portion is not the ninth preset binary number, determining an allocated largest resource index $S_{K-1}$ according to a corresponding relation between the value of the first portion and resource indexes M−1, M ... N−1, and determining that detection results of HARQ information about resources corresponding to bits with values which are 1 in the second indication amount $Q_2$ bits of the second portion in resources with resource indexes being $S_{K-1}-1$, $S_{K-1}-2$ ... $S_{K-1}-M+1$ are ACK.

Figure 5:
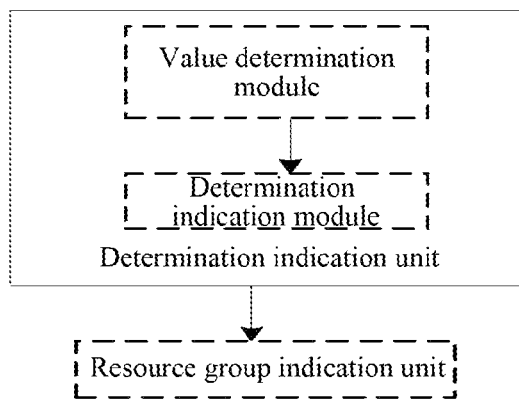
FIG. 5 illustrates a structural diagram of a resource allocation device according to the embodiment of the present disclosure.

FIG. 5 illustrates a structural diagram of a resource allocation device according to the embodiment of the present disclosure. As illustrated in FIG. 5, the device includes: a determination indication unit.

The determination indication unit is configured to send information about resources allocated to a resource allocation receiving end to the resource allocation receiving end through a first portion and a second portion of total indication amount Q bits.

The first portion contains first indication amount $Q_1$ bits and the second portion contains second indication amount $Q_2$ bits.

The number of resources allocated to the resource allocation receiving end is K, resource indexes corresponding to the K resources are $S_i$, $i \in [0, 1, 2 ... K-1]$, $S_i < S_{i+1}$, $1 \leq K \leq M$, and M is the number of virtual continuous resources allowed to be allocated by the resource allocation receiving end.

The determination indication unit includes a value determination module and a determination indication module.

The value determination module is configured to determine values of the first indication amount $Q_1$ bits of the first portion and values of the second indication amount $Q_2$ bits of the second portion according to a smallest resource index $S_0$ or a largest resource index $S_{K-1}$.

The determination indication module is configured to send information about resources allocated to the resource allocation receiving end to the resource allocation receiving end through the values of the first indication amount $Q_1$ bits of the first portion and the values of the second indication amount $Q_2$ bits of the second portion.

The value determination module is configured to:

predetermine the values of the first indication amount $Q_1$ bits of the first portion and the values of the second indication amount $Q_2$ bits of the second portion according to the smallest resource index $S_0$; or predetermine the values of the first indication amount $Q_1$ bits of the first portion and the values of the second indication amount $Q_2$ bits of the second portion according to the largest resource index $S_{K-1}$.

The value determination module is configured as that:

when $S_0 \leq N-M$, the first portion is a first preset binary number corresponding to the resource index $S_0$ and expressed by the first indication amount $Q_1$ bits;

when $S_0 \leq N-M$ and $K=1$, the values of the second indication amount $Q_2$ bits of the second portion are all 0;

when $S_0 \leq N-M$ and $K>1$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0; and when $S_0 > N-M$, the first portion is a second preset binary number expressed by the first indication amount $Q_1$ bits; and the second indication amount $Q_2$ bits of the second portion correspond to resources with resource indexes being $N-M+1, N-M+2 \ldots N-1$ one to one, and when $S_i \in \{N-M+1, N-M+2 \ldots N-1\}$, $i=1, 2 \ldots K-1$, a value of a bit corresponding to the resource index $S_i$ is 1 and values of other bits are 0, herein the first preset binary number is different from the second preset binary number.

The value determination module is configured as that:

when $S_{K-1} \geq M-1$, a value of the first portion is a third preset binary number corresponding to the resource index $S_{K-1}$ and expressed by the first indication amount $Q_1$ bits;

when $S_{K-1} \geq M-1$ and $K=1$, the values of the second indication amount $Q_2$ bits of the second portion are all 0;

when $S_{K-1} \geq M-1$ and $K>1$, the second indication amount $Q_2$ bits of the second portion correspond to resources with resource indexes being $S_{K-1}-1, S_{K<1}-2 \ldots S_{K-1}-M+1$ one to one, and when $S_i \in \{S_{K-1}-1, S_{K-1}-2 \ldots S_{K-1}-M+1\}$, $i=0, 1, \ldots K-2$, a value of the second portion corresponding to the resource index $S_i$ is 1 and values of other bits are 0; and when $S_{K-1} < M-1$, the first portion is a fourth preset binary number expressed by the first indication amount $Q_1$ bits; and the second indication amount $Q_2$ bits of the second portion correspond to resources with resource indexes being $0, 1 \ldots M-2$ one to one, and when $S_i \in \{0, 1 \ldots M-2\}$, $i=0, 1 \ldots K-1$, a value of a bit corresponding to the resource index $S_i$ is 1 and values of other bits are 0, herein the third preset binary number is different from the fourth preset binary number.

The value determination module is configured as that:

a bit value of the first portion is a first preset binary number corresponding to the resource index $S_0$ and expressed by the first indication amount $Q_1$ bits; or a second preset binary number corresponding to the resource index $S_{K-1}$ and expressed by the first indication amount $Q_1$ bits.

In an implementation mode, the value determination module is configured as that:

the first preset binary number is $((S_0+C)\%(2^{Q_1}-1))_{binary}$ or $(S_0)_{binary}$;

the second preset binary number is $((S_{K-1}+C)\%(2^{Q_1}-1))_{binary}$ or $(S_{K-1})_{binary}$, where C is any integral constant, when the first preset binary number is $((S_0+C)\%(2^{Q_1}-1))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0; and when the second preset binary number is $((S_{K-1}+C)\%(2^{Q_1}-1))_{binary}$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1 \ldots K-2$, a value of the second portion corresponding to the resource index $S_i$ is 1 and values of other bits are 0.

The determination indication module is configured to:

indicate that resources corresponding to bits with values which are 1 are the resources allocated to the resource allocation receiving end through the bits with values which are 1 in the second indication amount $Q_2$ bits of the second portion.

The device provided by the present disclosure further includes a resource group indication unit configured to, when two groups or more than two groups with each group having M virtual continuous resources need to be allocated, add a preset number of bits to indicate resource group indexes of allocated resource groups according to a number of groups of resources which need to be allocated.

Figure 6:
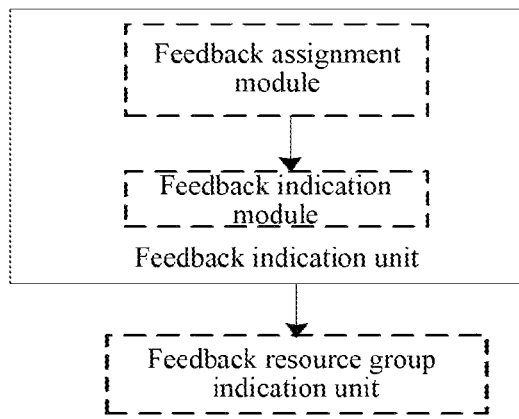
FIG. 6 illustrates a structural diagram of an information feedback device according to the embodiment of the present disclosure.

FIG. 6 illustrates a structural diagram of an information feedback device according to the embodiment of the present disclosure. As illustrated in FIG. 6, the device includes a feedback and indication unit.

The feedback and indication unit is configured to send Hybrid Automatic Repeat Request HARQ information through a first portion and a second portion of total feedback indication amount Q bits.

The first portion contains first indication amount $Q_1$ bits and the second portion contains second indication amount $Q_2$ bits.

Herein the number of detection results which are ACK in the HARQ information is K, $0 \leq K \leq M$, a resource index corresponding to an ith ACK is allocated to be $S_i$, where $i \in [0, 1, 2 \ldots K-1]$, $S_i < S_i+1$ and M is the maximum number of virtual continuous resources about which HARQ information is allowed to be fed back by an HARQ information receiving end.

The feedback indication unit includes a feedback assignment module and a feedback indication module.

The feedback assignment module is configured to, according to a resource index $S_0$ corresponding to a 0th ACK or a resource index $S_{K-1}$ corresponding to a (K-1)th ACK, determine values of the first indication amount $Q_1$ bits of the first portion and values of the second indication amount $Q_2$ bits of the second portion of the total feedback indication amount Q bits.

The feedback indication module is configured to send HARQ information through the values of the first indication amount $Q_1$ bits of the first portion and the values of the second indication amount $Q_2$ bits of the second portion.

The feedback assignment module is configured to:
predetermine the values of the first indication amount $Q_1$ bits of the first portion and the values of the second indication amount $Q_2$ bits of the second portion according to the resource index $S_0$; or predetermine the values of the first indication amount $Q_1$ bits of the first portion and the values of the second indication amount $Q_2$ bits of the second portion according to the resource index $S_{K-1}$.

The feedback assignment module is configured as that:
when $K \neq 0$ and $S_0 \leq N-M$, the first portion is a fifth preset binary number corresponding to the resource index $S_0$ and expressed by the first indication amount $Q_1$ bits;

when $K=1$ and $S_0 \leq N-M$, the values of the second indication amount $Q_2$ bits of the second portion are all 0;

when $K>1$ and $S_0 \leq N-M$, the values of the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0;

when $K \neq 0$ and $S_0 > N-M$, the first portion is a sixth preset binary number expressed by the first indication amount $Q_1$ bits;

when $S_0 > N-M$, the second indication amount $Q_2$ bits of the second portion correspond to resources with resource indexes being $N-M+1, N-M+2 \ldots N-1$ one to one, and when $S_i \in \{N-M+1, N-M+2 \ldots N-1\}$, $i=1, 2 \ldots K-1$, a value of a bit corresponding to the resource index $S_i$ is 1 and values of other bits are 0; and when $K=0$, the first portion is a seventh preset binary number expressed by the first indication amount $Q_1$ bits, herein every two of the fifth preset binary number, the sixth preset binary number and the seventh preset binary number are different.

The feedback assignment module is configured as that:
when $K \neq 0$ and $S_{K-1} \geq M-1$, the first portion is an eighth preset binary number corresponding to the resource index $S_{K-1}$ and expressed by the first indication amount $Q_1$ bits;

when $S_{K-1} \geq M-1$ and $K=1$, the values of the second indication amount $Q_2$ bits of the second portion are all 0;

when $S_{K-1} \geq M-1$ and $K>1$, the values of the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1, \ldots K-2$, a value of a bit corresponding to the resource index $S_i$ is 1 and values of other bits are 0;

when $K \neq 0$ and $S_{K-1} < M-1$, the value of the first portion is a ninth preset binary number expressed by the first indication amount $Q_1$ bits;

when $K=0$, the first portion is a tenth preset binary number expressed by the first indication amount $Q_1$ bits; and when $S_{K-1} < M-1$, the values of the second indication amount $Q_2$ bits of the second portion correspond to resources with resource indexes being $0, 1 \ldots M-2$ one to one, and when $S_i \in \{0, 1 \ldots M-2\}$, $i=0, 1 \ldots K-1$, a value of a bit corresponding to the resource index $S_i$ is 1 and values of other bits are 0, herein every two of the eighth preset binary number, the ninth preset binary number and the tenth preset binary number are different.

The feedback indication module is configured to,
send HARQ information to the HARQ information receiving end through bits with values which are 1 in the second indication amount $Q_2$ bits of the second portion.

The feedback assignment module is configured to:
assign a third preset binary number corresponding to the resource index $S_0$ and expressed by the first indication amount $Q_1$ bits; or a fourth preset binary number corresponding to the resource index $S_{K-1}$ and expressed by the first indication amount $Q_1$ bits, to a bit value of the first portion.

The feedback assignment module is configured as that:
the third preset binary number is $((S_0+C)\%(2^{Q_1}-1))_{binary}$ or $(S_0)_{binary}$;

the fourth preset binary number is $((S_{K-1}+C)\%(2^{Q_1}-1))_{binary}$ or $(S_{K-1})_{binary}$, where C is any integral constant, when $K \neq 0$ and the first preset binary number is $((S_0+C)\%(2^{Q_1}-1))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0;

when the second preset binary number is $((S_{K-1}+C)\%(2^{Q_1}-1))_{binary}$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1 \ldots K-2$, a value of the second portion corresponding to the resource index $S_i$ is 1 and values of other bits are 0;

when $K=0$ and the first preset binary number is $((S_0+C)\%(2^{Q_1}-1))_{binary}$, a bit value of the first portion is $((u+C)\%(2^{Q_1}-1))_{binary}$, herein $N-M \leq u < N$ and u is a positive integer; and the second indication amount $Q_2$ bits of the second portion are a fifth preset binary number;

the fifth preset binary number is different from a value of $((u+C)\%(2^{Q_1}-1))_{binary}$ when $K=0$;

when $K \neq 0$ and the first preset binary number is $((S_{K-1}+C)\%(2^{Q_1}-1))_{binary}$, a bit value of the first portion is $((u+C)\%(2^{Q_1}-1))_{binary}$, where u is an integer and $0 \leq u < M-2$; and the second indication amount $Q_2$ bits of the second portion are a sixth preset binary number; and the sixth preset binary number is different from a value of $((u+C)\%(2^{Q_1}-1))_{binary}$ when $K \neq 0$.

The device provided by the present disclosure further includes a feedback resource group indication unit configured to, when HARQ information about two groups or more than two groups with each group having M virtual continuous resources needs to be sent, add a preset number of bits to send resource group indexes of HARQ information feedback groups according to the number of groups of HARQ information which needs to be sent.

Figure 7:
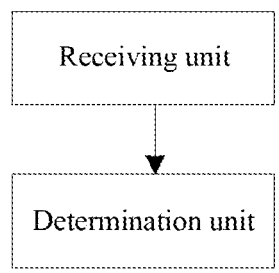
FIG. 7 illustrates a structural diagram of another resource allocation device according to the embodiment of the present disclosure.

FIG. 7 illustrates a structural diagram of another resource allocation device according to the embodiment of the present disclosure. As illustrated in FIG. 7, the device includes: a receiving unit and a determination unit.

The receiving unit is configured to receive information about resources allocated to the resource allocation device itself sent through a first portion and a second portion of total indication amount Q bits.

The determination unit is configured to determine the resources allocated to the resource allocation device itself according to values of first indication amount $Q_1$ bits of the first portion and values of second indication amount $Q_2$ bits of the second portion.

The determination unit is specifically configured to:
when the value of the first portion is a second preset binary number, determine that resources corresponding to bits with values which are 1 in the second indication amount $Q_2$ bits of the second portion in resources with resource indexes being N−M+1, N−M+2 ... N−1 are the resources allocated to the resource allocation device itself; and when the value of the first portion is not the second preset binary number, determine an allocated smallest resource index $S_0$ according to a corresponding relation between the value of the first portion and resource indexes 0, 1 ... N−M, and determine that resources corresponding to bits with values which are 1 in the second indication amount $Q_2$ bits of the second portion in resources with resource indexes being $S_0+1$, $S_0+2$ ... $S_0+M-1$ are the resources allocated to the resource allocation device itself.

The determination unit is configured to:

when the value of the first portion is a fourth preset binary number, determine that resources corresponding to bits with values which are 1 in the second indication amount $Q_2$ bits of the second portion in resources with resource indexes being 0, 1 ... M−2 are the resources allocated to the resource allocation device itself; and when the value of the first portion is not the fourth preset binary number, determine an allocated largest resource index $S_{K-1}$ according to a corresponding relation between the value of the first portion and resource indexes M−1, M ... N−1, and determine that resources corresponding to bits with values which are 1 in the second indication amount $Q_2$ bits of the second portion in resources with resource indexes being $S_{K-1}-1$, $S_{K-1}-2$ ... $S_{K-1}-M+1$ are the resources allocated to the resource allocation device itself.

The determination unit is configured to:

determine the smallest resource index $S_0$ or the largest resource index $S_{K-1}$ of allocated resources according to the first indication amount $Q_1$ bits of the first portion and resource indexes 0, 1 ... N−1;

when the smallest resource index $S_0$ of allocated resources is determined according to the first indication amount $Q_1$ bits of the first portion and resource indexes 0, 1 ... N−1, determine the resources allocated to the resource allocation device itself in resources with resource indexes being $S_0+1$, $S_0+2$ ... $S_0+M-1$ according to bits with values which are 1 and are not a first preset binary number in the second indication amount $Q_2$ bits of the second portion; and when the largest resource index $S_{K-1}$ of allocated resources is determined according to the first indication amount $Q_1$ bits of the first portion and resource indexes 0, 1 ... N−1, determine the resources allocated to the resource allocation device itself in resources with resource indexes being $S_{K-1}-1$, $S_{K-1}-2$ ... $S_{K-1}-M+1$ according to bits with values which are 1 and are not a second preset binary number in the second indication amount $Q_2$ bits of the second portion.

Figure 8:
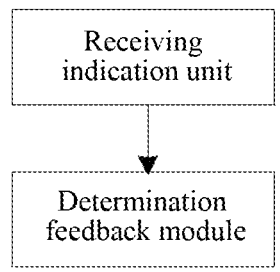
FIG. 8 illustrates a structural diagram of another information feedback device according to the embodiment of the present disclosure.

FIG. 8 illustrates a structural diagram of another information feedback device according to the embodiment of the present disclosure. As illustrated in FIG. 8, the device includes: a feedback receiving unit and a determination feedback unit.

The feedback receiving unit is configured to receive a feedback of HARQ information sent by an HARQ information sending end through a first portion and a second portion of total feedback indication amount Q bits.

The determination feedback unit is configured to determine to send an HARQ information feedback to the sending end according to values of first indication amount $Q_1$ bits of the first portion and values of second indication amount $Q_2$ bits of the second portion.

The determination feedback unit is configured to:

when the value of the first portion is a sixth preset binary number, determine that detection results of HARQ information about resources corresponding to bits with values which are 1 in the second indication amount $Q_2$ bits of the second portion in resources with resource indexes being N−M+1, N−M+2 ... N−1 are ACK, and feed back the detection results to the sending end; and when the value of the first portion is not the sixth preset binary number, determine an allocated smallest resource index $S_0$ according to a corresponding relation between the value of the first portion and resource indexes 0, 1 ... N−M, determine that detection results of HARQ information about resources corresponding to bits with values which are 1 in the second indication amount $Q_2$ bits of the second portion in resources with resource indexes being $S_0+1$, $S_0+2$ ... $S_0+M-1$ are ACK, and feed back the detection results to the sending end.

The determination feedback unit is configured to:

when the value of the first portion is a ninth preset binary number, determine that detection results of HARQ information about resources corresponding to bits with values which are 1 in the second indication amount $Q_2$ bits of the second portion in resources with resource indexes being 0, 1 ... M−2 are ACK, and feed back the detection results to the sending end; and when the value of the first portion is not the ninth preset binary number, determine an allocated largest resource index $S_{K-1}$ according to a corresponding relation between the value of the first portion and resource indexes M−1, M ... N−1, determine that detection results of HARQ information about resources corresponding to bits with values which are 1 in the second indication amount $Q_2$ bits of the second portion in resources with resource indexes being $S_{K-1}-1$, $S_{K-1}-2$ ... $S_{K-1}-M+1$ are ACK, and feed back the detection results to the sending end.

The methods provided by the present disclosure will be clearly described below in detail through specific application examples. The application examples are only used for stating the present disclosure instead of limiting the protection scope of the present disclosure.

Application Example 1

It is supposed that N=20, M=6 and indexes of physical resource blocks allocated to a terminal are 10 and 12. According to this application example, Q bits are used for indicating resource allocation to the UE, where Q=9, $Q_1=4$, $Q_2=5$, $S_0=10$, $S_1=12$ and K=2.

According to this application example of the present disclosure, a first portion is equal to a binary number corresponding to physical resource block indexes and expressed by bits. For example, the bits of the first portion are equal to $((S_0+C)\%(2^{Q_1}))_{binary}$, where C is a constant, when it is allowed that C=0, the bits of the first portion are 1010, when it is allowed that C is equal to 1, then the bits of the first portion are equal to 1011.

A second portion has 5 bits, and the 5 bits correspond to resource blocks 11, 12, 13, 14 and 15 one to one. For example, a 0th bit corresponds to a physical resource block 11, a 1st bit corresponds to a physical resource block 12 ..., and since $S_1 \in \{11, 12 ... 15\}$, the bits of the second portion are 01000.

For another example, it is supposed that N=20, M=6 and indexes of physical resource blocks allocated to a terminal are 14 and 16, i.e., $S_0=16$, $S_1=19$ and K=2. Since $S_0$ greater than N−M, bits of a first portion are equal to a preset binary number expressed by bits, and this preset binary number is different from a binary number corresponding to N−M. For example, when the bits of the first portion are equal to $(S_0)_{binary}$, the preset binary number may be a binary number corresponding to number 15 and expressed by first indication amount Q1 bits, i.e., the bits of the first portion are equal to 1111.

When $S_0>N-M$, the bits of the second portion correspond to physical resource blocks with indexes being 15, 16 . . . 19 one to one. Since $S_0 \in \{15, 16 \ldots 19\}$ and $S_i \in \{15, 16 \ldots 19\}$, the bits of the second portion are equal to 01001.

Composition patterns of the bits of the first portion and the bits of the second portion may be any patterns. An example will be provided below. Supposing that the bits of the first portion are $a_0, a_1 \ldots a_{Q1-1}$ and the bits of the second portion are $b_0, b_1 \ldots b_{Q2-1}$, bits of the total indication amount may be that: the bits of the first portion are high bits and the bits of the second portion are low bits, e.g., $a_0, a_1 \ldots a_{Q1-1} b_0, b_1 \ldots b_{Q2-1}$, or the bits of the first portion are low bits and the bits of the second portion are high bits, e.g., $b_0, b_1 \ldots b_{Q2-1} a_0, a_1 \ldots a_{Q1-1}$, or the second portion is inserted into the first portion or the first portion is inserted into the second portion, e.g., $a_0, a_1 \ldots b_0, b_1 \ldots b_{Q2-1} \ldots a_{Q1-1}$, insertion may be performed according to a preset way, e.g., $a_0, b_0, a_1, b_1 \ldots$, and the patterns are not limited to these several patterns in actual application.

Application Example 2

It is supposed that N=25, M=4 and indexes of subframes allocated to a terminal are 7, 8 and 9. According to this application example, bits are used for indicating resource allocation to the UE, where Q=11, $Q_1=5$, $Q_2=6$, $S_0=7$, $S_1=8$, $S_2=9$ and K=3.

Since $S_2>M-1=3$, bits of a first portion are equal to $(S_{K-1})_{binary}=(S_2)_{binary}=01001$. A second portion has 3 bits, the 3 bits correspond to subframe indexes 6, 7 and 8 one to one, and since $S_0 \in \{6, 7, 8\}$ and $S_1 \in \{6, 7, 8\}$, the bits of the second portion are equal to 011.

For another example, it is supposed that N=25, M=7 and indexes of subframes allocated to a terminal are 1 and 5. According to the present disclosure, bits are used for indicating resource allocation to the UE, where Q=11, $Q_1=5$, $Q_2=6$, $S_0=1$, $S_2=5$ and K=2.

Since $S_{K-1}<M-1$, the bits of the first portion are a preset binary number expressed by $Q_1$ bits, and this preset binary number is different from a corresponding binary number when $S_{K-1} \geq M-1$. Supposing that the corresponding binary numbers when $S_{K-1} \geq M-1$ are binary numbers corresponding to 6, 7 . . . 24, the above-mentioned preset binary number may be a binary number corresponding to any one or more of 0, 1 . . . 5 or 25, 26 . . . 31 and expressed by $Q_1$ bits. For another example, supposing that the corresponding binary numbers when $S_{K-1}>M-1$ are binary numbers corresponding to 0, 1 . . . 18, the above-mentioned preset binary number may be a binary number corresponding to any one or more of 19, 20 . . . 31 and expressed by $Q_1$ bits, i.e., when $S_{K-1}<M-1$, for different $S_{K-1}$, the corresponding preset binary numbers may be the same, or according to $S_{K-1}$, different preset binary numbers are selected from the above-mentioned set.

Application Example 3

It is supposed that N=15, M=6 and indexes of resource blocks allocated to a terminal are 5 and 7. According to this application example, Q bits are used for indicating resource allocation to the UE, where Q=9, $Q_1=4$, $Q_2=5$, $S_1=7$ and K=2.

According to this application example, bits of a first portion are equal to a binary number corresponding to physical resource block indexes and expressed using $Q_1$ bits. For example, the bits of the first portion are equal to $((S_0+C)\%(2^{Q_1}-1))_{binary}$, where C is a constant, when it is allowed that C=0, the bits of the first portion are equal to 0101, and when it is allowed that C=1, then the bits of the first portion are equal to 0110.

A second portion has 5 bits, and the 5 bits correspond to resource blocks 6, 7, 8, 9 and 10 one to one. For example, a 0th bit corresponds to a physical resource block 6, a 1st bit corresponds to a physical resource block 7 . . . , and since $S_1 \in \{6, 7 \ldots 10\}$, the bits of the second portion are 01000.

If a pattern that the bits of the first portion are high bits and the bits of the second portion are low bits is used, resource allocation indication bits are "010101000" (supposing C=0). According to the above-mentioned pattern, if indexes of resource blocks allocated to a terminal are 13 and 14, the first portion represents an index 13 of a start resource block, i.e., "1101", there is only one resource block, i.e., resource block 14 after this resource block, and if a bit corresponding to a resource block index exceeding 14 is set as "0" (of course it may be set as other preset values), the bits of the second portion are "10000" and resource allocation indication bits are "110110000". According to the above-mentioned pattern, if an index of a resource block allocated to a terminal is 14, the bits of the first portion are "1110". Since only one resource block is allocated to the terminal, the bits of the second portion are "00000" (of course it may be set as other preset values, e.g., the bits of the second portion are 11111, etc.), and resource allocation indication bits are "111000000".

If it is supposed that N=15, M=6 and indexes of resources allocated to a terminal are 5 and 7, it is allowed that the bits of the first portion represent an allocated largest resource block index 7, i.e., "0111", the bits of the second portion correspond to 5 resource blocks with indexes smaller than the largest resource block index, i.e., resource blocks with indexes respectively 2, 3, 4, 5 and 6, and $S_0 \in \{2, 3 \ldots 6\}$, the bits of the second portion are "00010". If a pattern that the bits of the first portion are low bits and the bits of the second portion are high bits is used, resource allocation indication bits are "000100111".

One skilled in the art can understand that all or partial steps in the above-mentioned methods may be completed by relevant hardware (such as a processor) instructed by a program, and the program may be stored in a computer readable storage medium such as a read-only memory, a magnetic disc or a compact disc. Optionally, all or partial steps in the above-mentioned embodiments may also be implemented by using one or more integrated circuits. Correspondingly, each module/unit in the above-mentioned embodiments may be implemented by means of hardware, e.g., corresponding functions thereof are implemented through an integrated circuit, and may also be implemented by means of a software function module, e.g., corresponding functions thereof are implemented through a processor executing programs/instructions stored in a memory. The present disclosure is not limited to combinations of hardware and software in any specific form.

Although the embodiments disclosed by the present are as described above, the contents are just embodiments used for facilitating the understanding about the present application and are not used for limiting the present application such as specific implementation methods in the embodiments of the present disclosure. Any one skilled in the field to which the present application belongs may make any modification and variation to implementation modes and details without departing from the essence and scope disclosed by the present application. However, the patent protection scope of the present application shall be still subjected to the scope defined by the attached claims.

INDUSTRIAL APPLICABILITY

By adopting the above-mentioned scheme, the overhead in the process of resource allocation is reduced and flexible resource allocation indication is realized.

What is claimed is:

1. A resource allocation method, comprising:

Sending, by a resource allocation sending end, information about resources allocated to a resource allocation receiving end to the resource allocation receiving end through a first portion and a second portion of total indication amount Q bits, wherein the first portion contains first indication amount $Q_1$ bits and the second portion contains second indication amount $Q_2$ bits, a number of resources allocated to the resource allocation receiving end is K, the information about resources allocated to the resource allocation receiving end is resource indexes corresponding to the K resources represented by $S_i$, $i \in [0, 1, 2 \ldots K-1]$, $S_i < S_{i+1}$, $1 \leq K \leq M$, and M is a number of virtual continuous resources allowed to be allocated to the resource allocation receiving end;

the M virtual continuous resources are any virtual continuous resources in resources with a total number of N, wherein resource indexes of the resources with the total number of N are sequentially $0, 1 \ldots N-1$, and M is a positive integer greater than or equal to 2.

2. The method according to claim 1, wherein the step of sending information about resources allocated to a resource allocation receiving end to the resource allocation receiving end through a first portion and a second portion of total indication amount Q bits comprises:

determining values of the first indication amount $Q_1$ bits of the first portion and values of the second indication amount $Q_2$ bits of the second portion according to a smallest resource index $S_0$ or a largest resource index $S_{K-1}$; and sending information about resources allocated to the resource allocation receiving end to the resource allocation receiving end through the values of the first indication amount $Q_1$ bits of the first portion and the values of the second indication amount $Q_2$ bits of the second portion, and, the step of sending information about resources allocated to a receiving end to the receiving end comprises:

indicating that resources corresponding to bits with values which are 1 are the resources allocated to the resource allocation receiving end through the bits with values which are 1 in the second indication amount $Q_2$ bits of the second portion.

3. The method according to claim 2, wherein the step of determining values of the first indication amount $Q_1$ bits of the first portion and values of the second indication amount $Q_2$ bits of the second portion comprises:

predetermining the values of the first indication amount $Q_1$ bits of the first portion and the values of the second indication amount $Q_2$ bits of the second portion according to the smallest resource index $S_0$; or predetermining the values of the first indication amount $Q_1$ bits of the first portion and the values of the second indication amount $Q_2$ bits of the second portion according to the largest resource index $S_{K-1}$.

4. The method according to claim 3, wherein a bit value of the first portion is a first preset binary number corresponding to the resource index $S_0$ and expressed by the first indication amount $Q_1$ bits; or a second preset binary number corresponding to the resource index $S_{K-1}$ and expressed by the first indication amount $Q_1$ bits, and, the first preset binary number is $((S_0+C)\%(2^{Q1}-1))_{binary}$ or $(S_0)_{binary}$;

the second preset binary number is $((S_{K-1}+C)\%(2^{Q1}-1))_{binary}$ or $(S_{K-1})_{binary}$, wherein C is any integral constant, when the first preset binary number is $((S_0+C)\%(2^{Q1}-1))_{binary}$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, $i=1, 2 \ldots K-1$, a value of a bit corresponding to the resource index $S_i$ is 1 and values of other bits are 0; and when the second preset binary number is $((S_{K-1}+C)\%(2^{Q1}-1))_{binary}$, the second indication amount $Q_2$ bits of the second portion correspond to resources with resource indexes being $S_{K-1}-1, S_{K-1}-2 \ldots S_{K-1}-M+1$ one to one, and when $S_i \in \{S_{K-1}-1, S_{K-1}-2 \ldots S_{K-1}-M+1\}$, $i=0, 1 \ldots K-2$, a value of the second portion corresponding to the resource index $S_i$ is 1 and values of other bits are 0, and, when the first preset binary number is $((S_0+C)\%(2^{Q1}-1))_{binary}$, for the other bits with values which are not 1 in the second indication amount $Q_2$ bits of the second portion, when $S_0+i>N-1$, $i=1, 2 \ldots M-1$, a value of a bit corresponding to $S_0+i$ is the first preset binary number; and when the second preset binary number is $((S_{K-1}+C)\%(2^{Q1}-1))_{binary}$, for the other bits with values which are not 1 in the second indication amount $Q_2$ bits of the second portion, wherein $((S_{K-1}+C)\%(2^{Q1}-1))_{binary}$ means a binary value corresponding to a value of $(S_{K-1}+C)\%(2^{Q1}-1)$, when $S_{K-1}-1<0$, $i=1, 2 \ldots M-1$, a value of a bit corresponding to $S_{K-1}-1$ is the second preset binary number.

5. The method according to claim 2, wherein, when $S_0 \leq N-M$, the first portion is a first preset binary number corresponding to the resource index $S_0$ and expressed by the first indication amount $Q_1$ bits;

when $S_0 \leq N-M$ and $K=1$, the values of the second indication amount $Q_2$ bits of the second portion are all 0;

when $S_0 \leq N-M$ and $K > 1$, the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0M-1\}$, $i=1, 2 \ldots K-1$, a value of a bit corresponding to the resource index $S_i$ is 1 and values of other bits are 0; and when $S_0 > N-M$, the first portion is a second preset binary number expressed by the first indication amount $Q_1$ bits; and the second indication amount $Q_2$ bits of the second portion correspond to resources with resource indexes being $N-M+1, N-M+2 \ldots N-1$ one to one, and when $S_i \in \{N-M+1, N-M+2 \ldots N-1\}$, $i=0, 1, 2 \ldots K-1$, a value of a bit corresponding to the resource index $S_i$ is 1 and values of other bits are 0, wherein the first preset binary number is different from the second preset binary number, and, the first preset binary number expressed by the first indication amount $Q_1$ bits is $((S_0+C)\%(2^{Q1}-1))_{binary}$ or $(S_0)_{binary}$, wherein $((S_0+C)\%(2^{Q1}-1))_{binary}$ means a binary value corresponding to a value of $(S_0+C)\%(2^{Q1}-1)$, $(S_0)_{binary}$ means a binary value corresponding to a value of $S_0$, wherein C is any integral constant.

6. The method according to claim 1, wherein, the total indication amount Q is greater than or equal to $\lceil \log_2(N-M+2) \rceil + M-1$; the first indication amount $Q_1$ is greater than or equal to $\lceil \log_2(N-M+2) \rceil$; and the second indication amount $Q_2$ is greater than or equal to M−1; or the total indication amount Q is greater than or equal to $\lceil \log_2(N) \rceil + M-1$; the first indication amount $Q_1$ is greater than or equal to $\lceil \log_2(N) \rceil$; and the second indication amount $Q_2$ is greater than or equal to M−1.

7. A non-volatile computer storage medium, storing computer-executable instructions, wherein the computer-executable instructions are used for executing the method according to claim 1.

8. An information feedback method, comprising:

Sending, by a Hybrid Automatic Repeat Request, HARQ, information sending end, HARQ information through a first portion and a second portion of total feedback indication amount Q bits, wherein the first portion contains first indication amount $Q_1$ bits and the second portion contains second indication amount $Q_2$ bits, a number of detection results which are ACK in the HARQ information is K, $0 \leq K \leq M$, a resource index corresponding to an ith ACK in the HARQ information is allocated to be $S_i$, wherein $i \in [0, 1, 2 \ldots K-1]$, $S_i < S_i+1$ and M is a maximum number of virtual continuous resources about which HARQ information is allowed to be fed back by an HARQ information receiving end;

the M virtual continuous resources are any virtual continuous resources in resources with a total number of N, wherein resource indexes of the resources with the total number of N are sequentially $0, 1 \ldots N-1$, and M is a positive integer greater than or equal to 2.

9. The method according to claim 8, wherein the step of sending Hybrid Automatic Repeat Request, HARQ, information through a first portion and a second portion of total indication amount Q bits comprises:

according to a resource index $S_0$ corresponding to a 0th ACK or a resource index $S_{K-1}$ corresponding to a (K−1)th ACK, determining values of the first indication amount $Q_1$ bits of the first portion and values of the second indication amount $Q_2$ bits of the second portion of the total feedback indication amount Q bits; and sending HARQ information through the values of the first indication amount $Q_1$ bits of the first portion and the values of the second indication amount $Q_2$ bits of the second portion.

10. The method according to claim 9, wherein, when and $K \neq 0$ and $S_0 \leq N-M$, the first portion is a fifth preset binary number corresponding to the resource index $S_0$ and expressed by the first indication amount $Q_1$ bits;

when K=1 and $S_0 \leq N-M$, the values of the second indication amount $Q_2$ bits of the second portion are all 0;

when K<1 and $S_0 \leq N-M$, the values of the second indication amount $Q_2$ bits of the second portion correspond to resources with resource indexes being $S_0+1, S_0+2 \ldots S_0+M-1$ one to one, and when $S_i \in \{S_0+1, S_0+2 \ldots S_0+M-1\}$, i=1, 2 \ldots K−1, a value of a bit corresponding to the resource index $S_i$ is 1 and values of other bits are 0;

when and $K \neq 0$ and $S_0 > N-M$, the first portion is a sixth preset binary number expressed by the first indication amount $Q_1$ bits;

when $S_0 > N-M$, the second indication amount $Q_2$ bits of the second portion correspond to resources with resource indexes being $N-M+1, N-M+2 \ldots N-1$ one to one, and when $S_i \in \{N-M+1, N-M+2 \ldots N-1\}$, i=1, 2 \ldots K−1, a value of a bit corresponding to the resource index $S_i$ is 1 and values of other bits are 0; and when K=0, the first portion is a seventh preset binary number expressed by the first indication amount $Q_1$ bits, wherein every two of the fifth preset binary number, the sixth preset binary number and the seventh preset binary number are different, and, the fifth preset binary number expressed by the first indication amount $Q_1$ bits is $((S_0+C)\%(2^{Q1}-1))_{binary}$ or $(S_0)_{binary}$, wherein $((S_0+C)\%(2^{Q1}-1))_{binary}$ means a binary value corresponding to a value of $(S_0+C)\%(2^{Q1}1)$, $(S_0)_{binary}$ means a binary value corresponding to a value of $S_0$, wherein C is any integral constant.

11. A non-volatile computer storage medium, storing computer-executable instructions, wherein the computer-executable instructions are used for executing the method according to claim 8.

12. A resource allocation device, comprising a memory for storing instructions and a processor which is configured to implement the instructions in the memory to:

send information about resources allocated to a resource allocation receiving end to the resource allocation receiving end through a first portion and a second portion of total indication amount Q bits, wherein the first portion contains first indication amount $Q_1$ bits and the second portion contains second indication amount $Q_2$ bits, a number of resources allocated to the resource allocation receiving end is K, the information about resources allocated to the resource allocation receiving end is resource indexes corresponding to the K resources represented by $S_i$, $i \in [0, 1, 2 \ldots K-1]$, $S_i < S_{i+1}$, $1 \leq K \leq M$, and M is a number of virtual continuous resources allowed to be allocated to the resource allocation receiving end;

the M virtual continuous resources are any virtual continuous resources in resources with a total number of N, wherein resource indexes of the resources with the total number of N are sequentially $0, 1 \ldots N-1$, and M is a positive integer greater than or equal to 2.

13. The device according to claim 12, wherein the processor is further configured to determine values of the first indication amount $Q_1$ bits of the first portion and values of the second indication amount $Q_2$ bits of the second portion according to a smallest resource index $S_0$ or a largest resource index $S_{K-1}$; and send information about resources allocated to the resource allocation receiving end to the resource allocation receiving end through the values of the first indication amount $Q_1$ bits of the first portion and the values of the second indication amount $Q_2$ bits of the second portion, and, indicate that resources corresponding to bits with values which are 1 are the resources allocated to the resource allocation receiving end through the bits with values which are 1 in the second indication amount $Q_2$ bits of the second portion.

14. The device according to claim 13, wherein the processor is configured to:

predetermine the values of the first indication amount $Q_1$ bits of the first portion and the values of the second indication amount $Q_2$ bits of the second portion according to the smallest resource index $S_0$; or predetermine the values of the first indication amount $Q_1$ bits of the first portion and the values of the second indication amount $Q_2$ bits of the second portion according to the largest resource index $S_{K-1}$.

15. The device according to claim 13, wherein when $S_0 \leq N-M$, the first portion is a first preset binary number corresponding to the resource index $S_0$ and expressed by the first indication amount $Q_1$ bits;

when $S_0 \leq N-M$ and $K=1$, the values of the second indication amount $Q_2$ bits of the second portion are all 0;

when $S_0 \leq N-M$ and $K>1$, the second indication amount $Q_2$ bits of the second portion correspond to resources with resource indexes being $S_0+1$, $S_0+2$... $S_0+M-1$ one to one, and when $S_i \in \{S_0+1, S_0+2... S_0+M-1\}$, $i=1, 2... K-1$, a value of a bit corresponding to the resource index $S_i$ is 1 and values of other bits are 0; and when $S_0 > N-M$, the first portion is a second preset binary number expressed by the first indication amount $Q_1$ bits; and the second indication amount $Q_2$ bits of the second portion correspond to resources with resource indexes being $N-M+1, N-M+2... N-1$ one to one, and when $S_i \in \{N-M+1, N-M+2... N-1\}$, $i=1, 2... K-1$, a value of a bit corresponding to the resource index $S_i$ is 1 and values of other bits are 0, wherein the first preset binary number is different from the second preset binary number.

16. The device according to claim 13, wherein a bit value of the first portion is a first preset binary number corresponding to the resource index $S_0$ and expressed by the first indication amount $Q_1$ bits; or a second preset binary number corresponding to the resource index $S_{K-1}$ and expressed by the first indication amount $Q_1$ bits, and, the first preset binary number is $((S_0+C)\%(2^{Q_1}-1))_{binary}$ or $(S_0)_{binary}$, wherein $((S_0+C)\%(2^{Q_1}-1))_{binary}$ means a binary value corresponding to a value of $(S_0+C)\%(2^{Q_1}-1)$, $(S_0)_{binary}$ means a binary value corresponding to a value of $S_0$;

the second preset binary number is $((S_{K-1}+C)\%(2^{Q_1}-1))_{binary}$ or $(S_{K-1})_{binary}$, wherein C is any integral constant, when the first preset binary number is $((S_0+C)\%(2^{Q_1}-1))_{binary}$, the second indication amount $Q_2$ bits of the second portion correspond to resources with resource indexes being $S_0+1, S_0+2... S_0+M-1$ one to one, and when $S_i \in \{S_0+1, S_0+2... S_0+M-1\}$, $i=1, 2... K-1$, a value of a bit corresponding to the resource index $S_i$ is 1 and values of other bits are 0; and when the second preset binary number is $((S_{K-1}+C)\%(2^{Q_1}-1))_{binary}$, the second indication amount $Q_2$ bits of the second portion correspond to resources with resource indexes being $S_{K-1}-1, S_{K-1}-2... S_{K-1}-M+1$ one to one, and when $S_i \in \{S_{K-1}-1, S_{K-1}-2... S_{K-1}-M+1\}$, $i=0, 1... K-2$, a value of the second portion corresponding to the resource index $S_i$ is 1 and values of other bits are 0.

17. An information feedback device, comprising a memory for storing instructions and a processor which is configured to implement the instructions in the memory to:

send Hybrid Automatic Repeat Request, HARQ, information through a first portion and a second portion of total feedback indication amount Q bits, wherein the first portion contains first indication amount $Q_1$ bits and the second portion contains second indication amount $Q_2$ bits, a number of detection results which are ACK in the HARQ information is K, $0 \leq K \leq M$, a resource index corresponding to an ith ACK in the HARQ information is allocated to be $S_i$, wherein $i \in [0, 1, 2... K-1]$, $S_i < S_i+1$ and M is a maximum number of virtual continuous resources about which HARQ information is allowed to be fed back by an HARQ information receiving end;

the M virtual continuous resources are any virtual continuous resources in resources with a total number of N, wherein resource indexes of the resources with the total number of N are sequentially $0, 1... N-1$, and M is a positive integer greater than or equal to 2.

18. The device according to claim 17, wherein the processor is configured to:

according to a resource index $S_0$ corresponding to a 0th ACK or a resource index $S_{K-1}$ corresponding to a (K−1)th ACK, determine values of the first indication amount $Q_1$ bits of the first portion and values of the second indication amount $Q_2$ bits of the second portion of the total feedback indication amount Q bits; and send HARQ information through the values of the first indication amount $Q_1$ bits of the first portion and the values of the second indication amount $Q_2$ bits of the second portion, and, when $K \neq 0$ and $S_0 \leq N-M$, the first portion is a fifth preset binary number corresponding to the resource index $S_0$ and expressed by the first indication amount $Q_1$ bits;

when $K=1$ and $S_0 \leq N-M$, the values of the second indication amount $Q_2$ bits of the second portion are all 0;

when $K>1$ and $S_0 \leq N-M$, the values of the second indication amount $Q_2$ bits of the second portion correspond to resources with resource indexes being $S_0+1$, $S_0+2... S_0+M-1$ one to one, and when $S_i \in \{S_0+1, S_0+2... S_0+M-1\}$, $i=1, 2... K-1$, a value of a bit corresponding to the resource index $S_i$ is 1 and values of other bits are 0;

when and $K \neq 0$ and $S_0 > N-M$, the first portion is a sixth preset binary number expressed by the first indication amount $Q_1$ bits;

when $S_0 > N-M$, the second indication amount $Q_2$ bits of the second portion correspond to resources with resource indexes being $N-M+1, N-M+2... N-1$ one to one, and when $S_i \in \{N-M+1, N-M+2... N-1\}$, $i=1, 2... K-1$, a value of a bit corresponding to the resource index $S_i$ is 1 and values of other bits are 0; and when $K=0$, the first portion is a seventh preset binary number expressed by the first indication amount $Q_1$ bits, wherein every two of the fifth preset binary number, the sixth preset binary number and the seventh preset binary number are different.

\* \* \* \* \*